United States Patent
Matsumoto et al.

(10) Patent No.: US 8,035,726 B2
(45) Date of Patent: Oct. 11, 2011

(54) DIGITAL CAMERA AND FOCUS CONTROL METHOD

(75) Inventors: Hisayuki Matsumoto, Hachioji (JP); Takeshi Kindaichi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 635 days.

(21) Appl. No.: 12/115,930

(22) Filed: May 6, 2008

(65) Prior Publication Data
US 2008/0278618 A1    Nov. 13, 2008

(30) Foreign Application Priority Data

May 7, 2007    (JP) ................. 2007-122453

(51) Int. Cl.
*H04N 5/232*    (2006.01)
*G03B 17/00*    (2006.01)
(52) U.S. Cl. .......................................... 348/356; 396/86
(58) Field of Classification Search .................. 348/345, 348/346, 349, 355, 356, 348, 353, 354, 361, 348/335
See application file for complete search history.

(56) References Cited

U.S. PATENT DOCUMENTS

| | | | | |
|---|---|---|---|---|
| 4,314,748 A * | 2/1982 | Kawabata et al. | ............... | 396/90 |
| 5,659,823 A * | 8/1997 | Mukai et al. | .................. | 396/291 |
| 6,580,571 B2 * | 6/2003 | Sasaki et al. | .................. | 359/823 |
| 7,486,330 B2 * | 2/2009 | Sawachi | ........................ | 348/345 |
| 7,493,033 B2 * | 2/2009 | Triteyaprasert et al. | ........ | 396/79 |
| 7,590,340 B2 * | 9/2009 | Senba | ............................ | 396/121 |
| 2002/0039242 A1 * | 4/2002 | Sasaki et al. | .................. | 359/819 |
| 2003/0174232 A1 * | 9/2003 | Yahagi et al. | ................. | 348/345 |
| 2004/0201770 A1 * | 10/2004 | Sawachi | ........................ | 348/350 |
| 2005/0219401 A1 * | 10/2005 | Oikawa | ........................ | 348/345 |

FOREIGN PATENT DOCUMENTS

| | | |
|---|---|---|
| JP | 6-113184 | 4/1994 |
| JP | 2001-042207 | 2/2001 |
| JP | 2002-107609 | 4/2002 |

\* cited by examiner

*Primary Examiner* — David Ometz
*Assistant Examiner* — Ahmed Berhan
(74) *Attorney, Agent, or Firm* — Straub & Pokotylo; John C. Pokotylo

(57) ABSTRACT

A focus evaluation value representing a focusing state of a taking lens is repeatedly calculated on the basis of an image signal output from an imaging section of a digital camera, a change in the focus evaluation value generated by the movement of the taking lens is detected, when a predetermined change in the focus evaluation value is detected in manual focusing, at least one of a first mode for continuing manual focusing and a second mode for making the transition to auto-focusing, in which the taking lens is automatically moved, is selected, when the predetermined change in the focus evaluation value is detected in the case in which the second mode is selected, the focusing operation is automatically switched to auto-focusing, whereby the taking lens is automatically moved such that the focus evaluation value is the peak value.

14 Claims, 17 Drawing Sheets

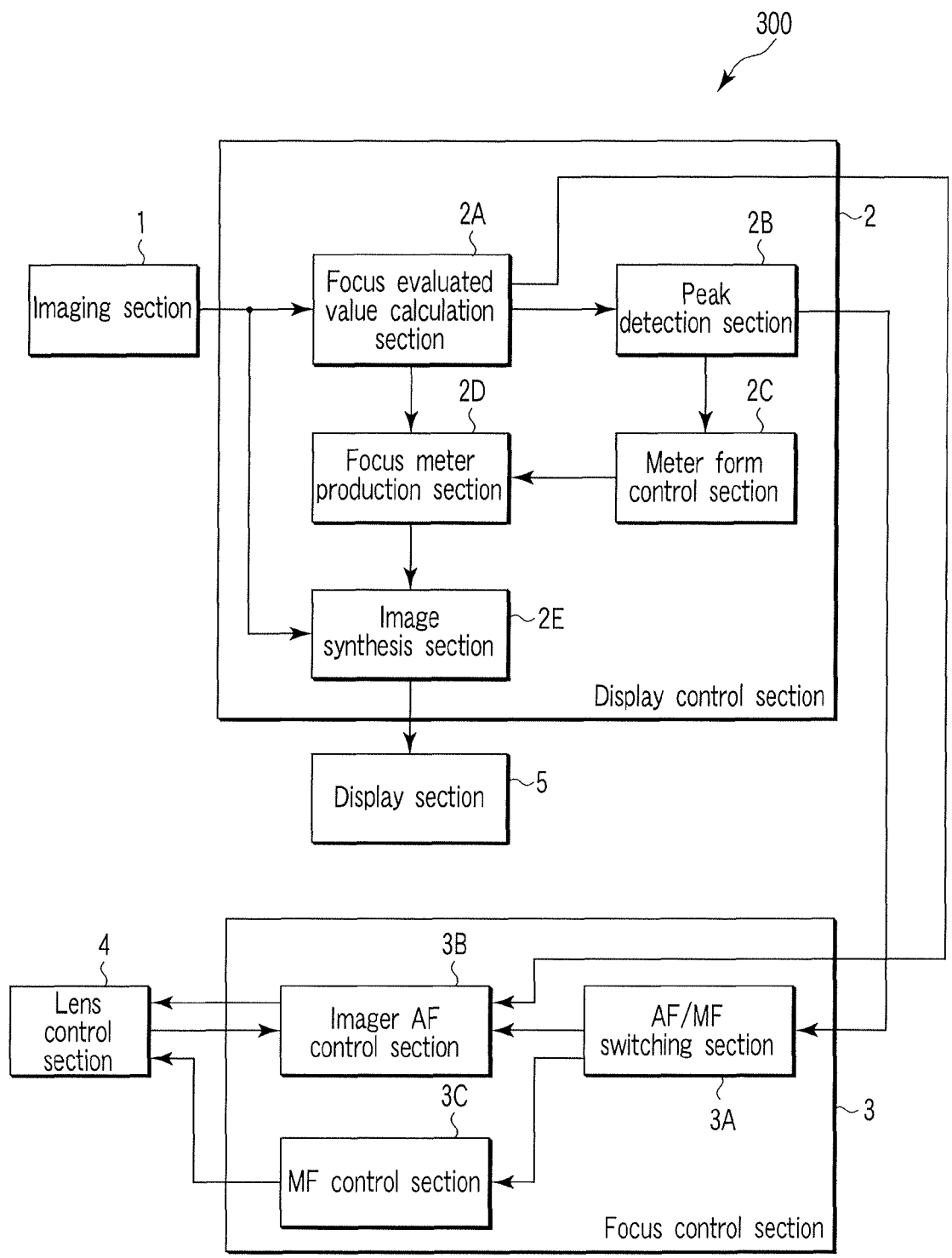
F I G. 1

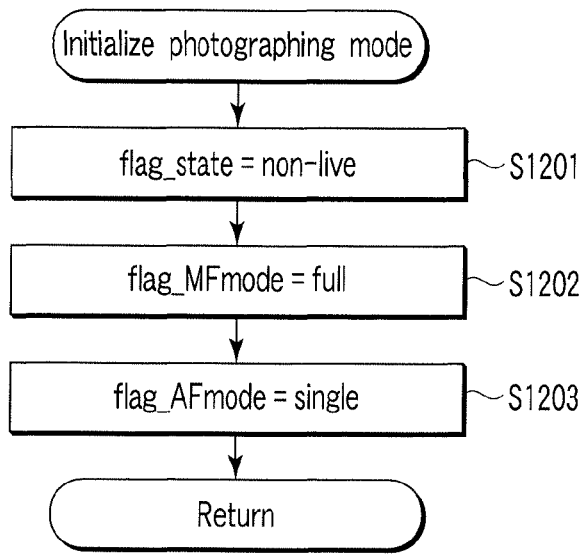
F I G. 5
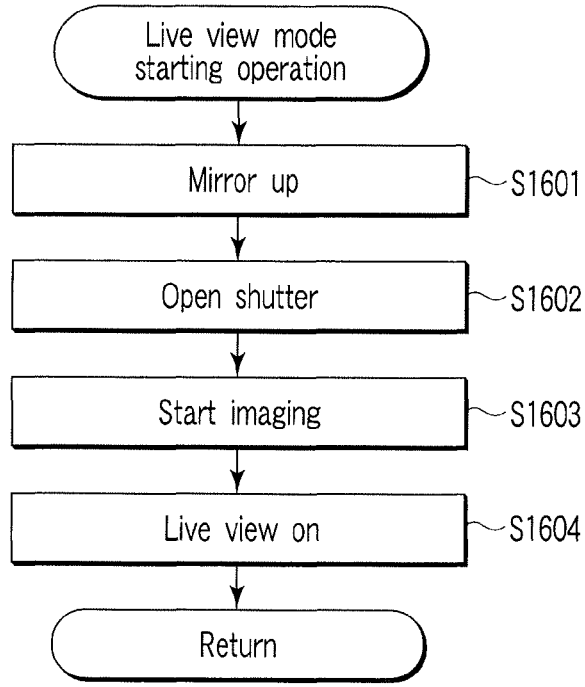
F I G. 6

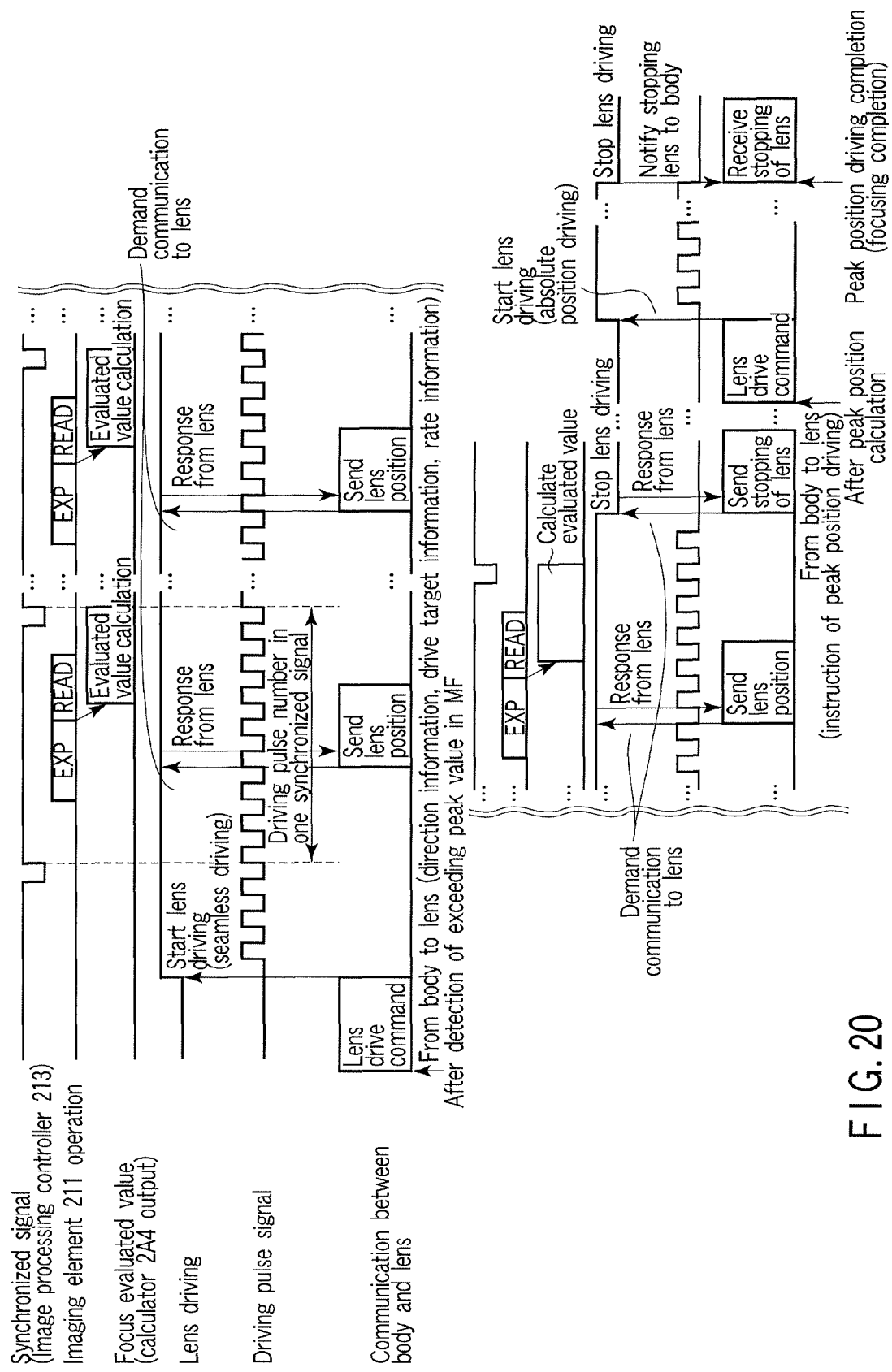
F I G. 20

DIGITAL CAMERA AND FOCUS CONTROL METHOD

CROSS-REFERENCE TO RELATED APPLICATIONS

This application is based upon and claims the benefit of priority from prior Japanese Patent Application No. 2007-122453, filed May 7, 2007, the entire contents of which are incorporated herein by reference.

BACKGROUND OF THE INVENTION

1. Field of the Invention

The present invention relates to a digital camera capable of focus adjustment by a manual operation while seeing an image of an electronic viewfinder, and a focus control method in the digital camera.

2. Description of the Related Art

In general, in a method for manual focusing (MF) in a digital camera, a user operates to rotate a forced adjustment ring (focus ring) of a lens barrel to move a taking lens. The user then observes a subject, seeing a finder or an electronic viewfinder (EVF) under movement of the taking lens, to stop the taking lens at a lens position where it is determined that focusing is completed. In this operation method of MF, the user cannot always stop the taking lens at an optimum focusing position depending on the user's performance, viewability of the finder, and the like.

Meanwhile, in auto-focusing (AF) in the digital camera, the taking lens is automatically moved, and predetermined calculation is performed on an output signal from an imaging element when the taking lens is moved, whereby an evaluation value (hereinafter referred to as focus evaluation value) representing a focusing level is calculated. The taking lens is moved to a lens position where the focus evaluation value exhibits the peak, whereby the optimum focusing position is provided.

The focus evaluation value represents a magnitude of a high frequency component of an image signal, which is output from the imaging element when a subject is taken. As the taking lens is closer to the focusing position, the focus evaluation value shows a higher value. Thereby, in AF, a position of the taking lens where the focus evaluation value is the peak value is searched, whereby the taking lens can be adjusted at the optimum focusing position. AF is referred to as, for example, mountain-climbing AF, imager AF, or contrast AF. In the invention, AF is referred to as imager AF.

There is a well-known technique for reducing a time required for focusing and improving focusing accuracy by combining MF with imager AF. For instance, in Jpn. Pat. Appln. KOKAI Publication No. 2002-107609, the taking lens is operated to be moved from a non-focusing position to a focusing position by MF. At this time, the focus evaluation value is calculated by imager AF. When the focus evaluation value changed beyond a predetermined threshold value, the focusing operation is switched from MF to AF, and then focusing is performed. Namely, focusing is finally performed by AF. In Jpn. Pat. Appln. KOKAI Publication No. 2002-107609, it is possible to realize more accurate focusing than general focusing by MF, and, at the same time, to reduce the time required for focusing.

Meanwhile, a technique using the focus evaluated value in a process for focusing by MF is well-known. For instance, Jpn. Pat. Appln. KOKAI Publication No. 6-113184 discloses a camera apparatus which displays a level of a focusing state in real time. Jpn. Pat. Appln. KOKAI Publication No. 2001-42207 discloses an electronic camera which displays information of a position of the taking lens and displays information of the focus evaluation value with a bar. Jpn. Pat. Appln. KOKAI Publications Nos. 6-113184 and 2001-42207 clarify the focusing level to a user, and, at the same time, realize MF relatively more accurate than general MF.

In addition to the well-known techniques for obtaining the focusing state in a digital camera, the background art of the conventional lens interchangeable camera will be described hereinafter.

In the lens interchangeable camera, an interchangeable lens can be attached thereto and detached therefrom. Such an interchangeable lens has been sold from the times of film cameras. As the current lens interchangeable camera, there is a single-lens reflex digital camera, for example. The focus detection by AF in the single-lens reflex digital camera is mainly performed by TTL phase difference AF, for example.

As the previous film camera, there is a single-lens reflex camera. The focus detection in the single-lens reflex camera has adopted a TTL phase difference AF system, for example. Thereby, the lens drive system on the interchangeable lens side is designed optimally for an AF system.

Namely, the lens drive system on the interchangeable lens side in any camera adopts the TTL phase difference AF system, for example. In the TTL phase difference AF system, a subject image is divided into a plurality of light paths, and thus two subject images are obtained. A defocus amount of the taking lens is then detected by using deviation between those subject images, and thus the taking lens is driven by a lens drive amount corresponding to the defocus amount. Thereby, the taking lens is adjusted at the focusing position. As a lens driving actuator, for example, a direct current (DC) motor or ultrasonic (US) motor is generally used.

BRIEF SUMMARY OF THE INVENTION

A digital camera according to a first aspect of the present invention comprises: a taking lens which forms a subject image of a subject; a lens drive section which moves the taking lens along an optical axis; an imaging section which repeatedly takes the subject image formed by the taking lens at a predetermined time interval to output a sequence of image signals; a focus evaluation value calculation section which repeatedly calculates a focus evaluation value representing a degree of a focusing state of the taking lens with respect to the subject image, on the basis of the image signals output from the imaging section; a manual focus controller which controls the lens drive section to move the taking lens in response to a manual operation; a focus evaluation value change detection section which detects a change in the focus evaluation value generated by the movement of the taking lens; an auto focus controller which controls the lens drive section in accordance with the change in the focus evaluation value detected by the focus evaluation value change detection section to moves the taking lens so as to be focused on the imaging section; and a switching section which switches the control of the lens drive section from the manual focus controller to the auto focus controller when the focus evaluation value change detection section detects a predetermined change pattern in the focus evaluation value.

A digital camera according to a second aspect of the present invention comprises: a taking lens which forms a subject image of a subject; a lens drive section which moves the taking lens along an optical axis; an imaging section which repeatedly takes the subject image formed by the taking lens at a predetermined time interval to output continuous image signals; a focus evaluation value calculation section which repeatedly calculates a focus evaluation value representing a degree of a focusing state of the taking lens with respect to the subject image, on the basis of the image signal output from the imaging section; a manual focus controller which controls the lens drive section to move the taking lens in response to a manual operation; a splitting optical system which splits a light path, having entered through the taking lens, into a plurality of light paths to form an image; a phase difference detection section which detects an amount of deviation between a plurality of optical images formed by the splitting optical system; a first auto focus controller which controls the lens drive section on the basis of the amount of deviation between said each optical image, detected by the phase difference detection section, to move the taking lens such that the subject image is focused on the imaging section;

a focus evaluation value change detection section which detects a change in the focus evaluation value generated by the movement of the taking lens; a second auto focus controller which controls the lens drive section in accordance with the change in the focus evaluation value detected by the focus evaluation value change detection section to move the taking lens so as to be focused on the imaging section; and a focus mode selection section which selects at least one of an auto focus mode, a manual focus mode and a semi auto focus mode, the auto focus mode driving the lens drive section under the control of the first auto focus controller to move the taking lens to the focusing position, the manual focus mode driving the lens drive section under the control of the manual focus controller to move the taking lens by an manual operation, the semi auto focus mode automatically switching from the manual focus controller to the second auto focus controller when a predetermined change pattern in the focus evaluation value is detected by the focus evaluation value change detection section to move the taking lens to the focusing position.

A focus control method according to a third aspect of the present invention comprises: repeatedly taking a subject in a continuous manner at predetermined time interval by an imaging section and outputting a sequence of image signals; displaying a live image on the basis of the sequence of image signals taken by the imaging section to a monitor of the digital camera; repeatedly calculating a focus evaluation value, representing a degree of a focusing state of a taking lens, on the basis of an image signal output from the imaging section; performing manual focusing for moving the taking lens in response to a manual; detecting a change in the focus evaluation value generated in accordance with the movement of the taking lens; and when a predetermined change pattern in the focus evaluation value is detected during manual focusing, performing one of a first focusing mode for continuing manual focusing and a second focusing mode for making transition to auto focusing in which the taking lens is automatically moved such that the focus evaluation value becomes a peak value in accordance with a predetermined selection by an user.

BRIEF DESCRIPTION OF THE SEVERAL VIEWS OF THE DRAWING

FIG. 1 is a schematic block configuration diagram showing a focus control system in one embodiment of a digital camera according to the invention;

FIG. 5 is a photographing mode initialization flowchart in the digital camera;

FIG. 6 is a live view mode starting operation flowchart in the digital camera;

FIG. 20 is a timing chart of imager AF in the digital camera;

DETAILED DESCRIPTION OF THE INVENTION

Figure 2:
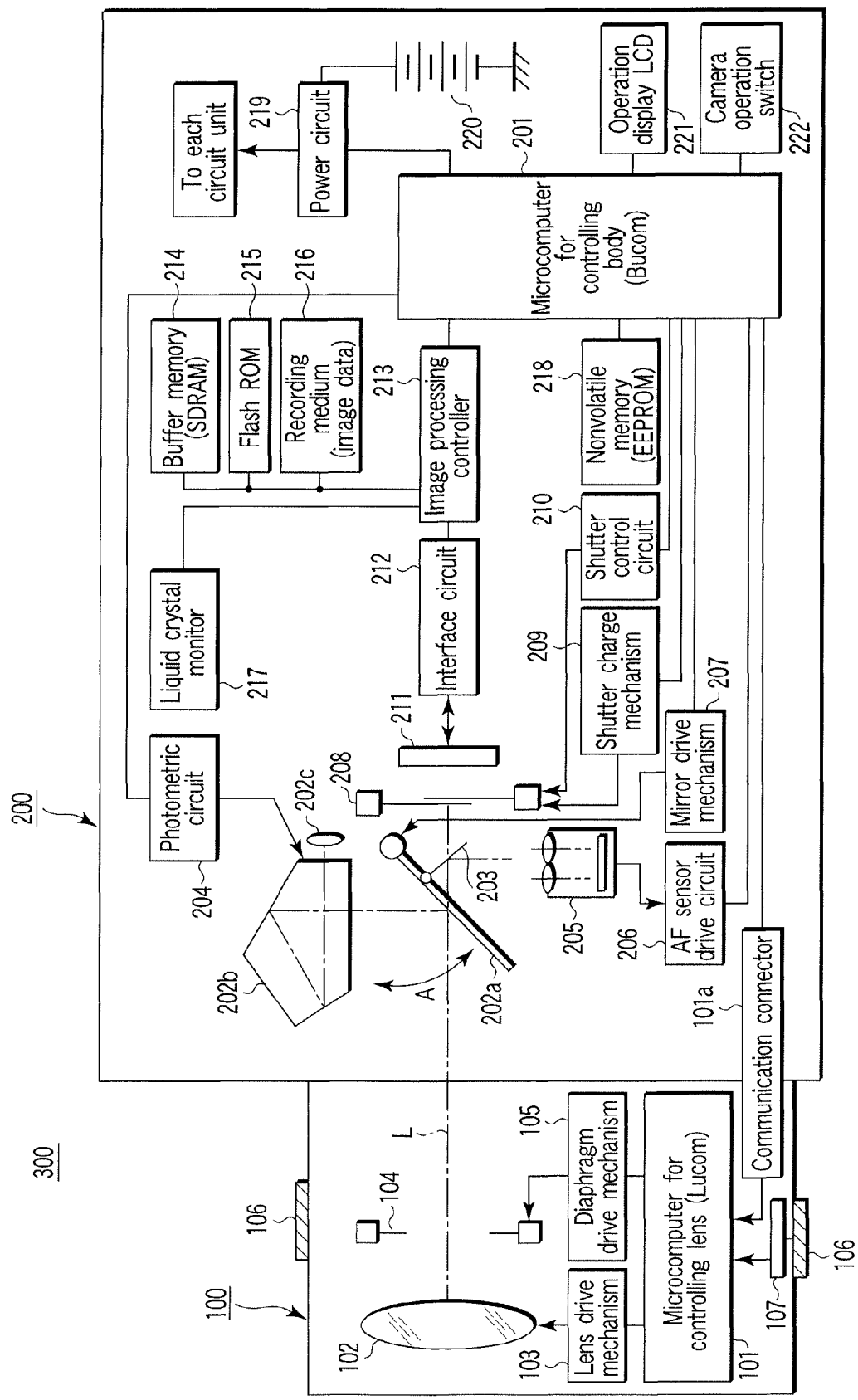
FIG. 2 is a block diagram showing the entire configuration of the digital camera.

Hereinafter, an embodiment of the invention will be described with reference to the drawings.

FIG. 1 is a schematic block configuration diagram of a focus control system of a digital camera 300. The digital camera 300 is provided with a focus control system. The focus control system has an imaging section 1, a display control section 2, a focus control section 3, a lens control section 4, and a display section 5. The display control section 2 has a focus evaluation value calculation section 2A, a peak detection section 2B, a meter form control section 2C, a focus meter production section 2D, and an image synthesis section 2E. The focus control section 3 has an AF/MF switching section 3A, an imager AF control section 3B, and an MF control section 3C.

The imaging section 1 takes a subject to output the image signal of the subject. The image signal output from the imaging section 1 is sent to the focus evaluation value calculation section 2A and to the image synthesis section 2E. The focus evaluation value calculation section 2A calculates the focus evaluation value for evaluating a focusing level to the present subject, and sends the focus evaluation value to the peak detection section 2B, the focus meter production section 2D, and the imager AF control section 3B.

The peak detection section 2B inputs the focus evaluation value from the focus evaluation value calculation section 2A, and judges whether the focus evaluation value has passed the peak value to be changed. When it is judged that the focus evaluation value has passed the peak value to be changed, the peak detection section 2B outputs a peak detection signal representing that the focus evaluation value has passed the peak value to be changed. The peak detection section 2B sends the peak detection signal to the meter form control section 2C and the AF/MF switching section 3A. Namely, the peak detection section 2B detects that the focus evaluation value, obtained when a taking lens of the digital camera 300 is driven by a user (focusing operation) (MF), has passed the peak value, to thereby output the peak detection signal.

The focus meter production section 2D inputs the focus evaluation value from the focus evaluation value calculation section 2A to produce image data of a focus meter, which visually represents the focus evaluation value as graphics.

On the basis of the peak detection signal output from the peak detection section 2B, the meter form control section 2C generates a signal for indicating a display format of the image data of the focus meter, produced by the focus meter production section 2D, and the presence of a peak hold display, which will be hereinafter described, to send the signal to the focus meter production section 2D.

The image synthesis section 2E synthesizes the image signal output from the imaging section 1 and the image data of the focus meter produced by the focus meter production section 2D. The synthesized image data is sent to the display section 5 constituted of a monitor and so on.

The focus control section 3 controls the lens control section 4 to perform the focus control. The AF/MF switching section 3A switches the focus control between auto-focusing (AF) and manual focusing (MF) in accordance with the peak detection signal output from the peak detection section 2B.

In a partial MF mode as the characteristics of the invention to be hereinafter described, the MF control section 3C performs MF until the focus evaluation value is determined to changed beyond the peak value. After the focus evaluation value has been judged to changed beyond the peak value, the imager AF control section 3B performs imager AF. The focus evaluation value output from the focus evaluation value calculation section 2A is used for imager AF performed by the imager AF control section 3B.

The lens control section 4 is controlled by the imager AF control section 3B and the MF control section 3C, and controls a lens to drive the lens in a direction parallel to an optical axis L for the focusing purpose. The lens control section 4 outputs lens position information to the imager AF control section 3B. The imager AF control section 3B performs imager AF by using the lens position information from the control section 4 for imager AF control.

FIG. 2 is a block diagram of the entire configuration of the digital camera 300. The digital camera 300 is constituted of a lens barrel 100 and a digital camera body 200. The lens barrel 100 can be attached to or detached from the digital camera body 200. The lens barrel 100 is provided with a microcomputer 101 (hereinafter referred to as a lens microcomputer) for controlling a lens, a communication connector 101a, a photographing optical system 102, a lens drive mechanism 103, a diaphragm 104, a diaphragm drive mechanism 105, a focus ring 106, and a rotation detection circuit 107.

The digital camera body 200 is provided with a microcomputer 201 (hereinafter referred to as a body microcomputer) for controlling the body, a main mirror 202a, a pentaprism 202b, an eyepiece lens 202c, a sub mirror 203, a photometric circuit 204, an AF sensor unit 205, an AF sensor drive circuit 206, a mirror drive mechanism 207, a shutter section 208, a shutter charge mechanism 209, a shutter control circuit 210, an imaging element 211, an interface circuit 212, an image processing controller 213, a buffer memory 214, a flash ROM 215, a recording medium 216, a liquid crystal monitor 217, a nonvolatile memory 218, a power circuit 219, a battery 220, an operation display LCD 221, and a camera operation switch 222.

The correspondence between the configuration of the digital camera 300 shown in FIG. 1 and the configuration of the digital camera 300 shown in FIG. 2 is shown as follows. The imaging section 1 corresponds to the photographing optical system 102, the diaphragm 104, the shutter section 208, the imaging element 211, and the interface circuit 212. The display control section 2 corresponds to the image processing controller 213, the buffer memory 214, and the like. The focus control section 3 also corresponds to the image processing controller 213, the buffer memory 214, and the like. The lens control section 4 corresponds to the lens microcomputer 101 and the lens drive mechanism 103. The display section 5 corresponds to the liquid crystal monitor 217.

The body microcomputer 201 controls the image processing controller 213 for each processing in the imaging section 1, the focus evaluation value calculation section 2A, the peak detection section 2B, the focus meter production section 2D, the image synthesis section 2E, and the focus control section 3, and accesses the buffer memory 214.

The buffer memory 214 temporarily stores data about each processing performed by the focus evaluation value calculation section 2A, the peak detection section 2B, the focus meter production section 2D, and the image synthesis section 2E.

The lens microcomputer 101 controls each part of the lens barrel 100, while the body microcomputer 201 controls each part of the digital camera body 200. When the lens barrel 100 is mounted to the digital camera body 200, the lens microcomputer 101 and the body microcomputer 201 are connected to each other through the communication connector 101a, whereby the lens microcomputer 101 and the body microcomputer 201 are communicable with each other. The lens microcomputer 101 is operated following the body microcomputer 201.

The photographing optical system 102 is provided in the inside of the lens barrel 100. The photographing optical system 102 is constituted of a plurality of optical lenses, for example. The photographing optical system 102 has, in the plurality of optical lenses, a focus lens (taking lens) for focusing adjustment. Meanwhile, the lens drive mechanism 103 includes a motor. The focus lens is driven by the motor of the lens drive mechanism 103 to be moved in a direction parallel to the optical axis L of the photographing optical system 102. Further, the lens drive mechanism 103 sends the information about the position of the focus lens to the lens microcomputer 101.

The diaphragm 104 is provided on the optical axis L of the photographing optical system 102. The diaphragm drive mechanism 105 is connected to the diaphragm 104. The diaphragm drive mechanism 105 includes a motor. Thereby, the diaphragm 104 is driven to be opened and closed by the motor of the diaphragm drive mechanism 105. When the opening and closing of the diaphragm 104 is controlled, the amount of light incident on the digital camera body 200 through the photographing optical system 102 is also controlled.

The lens microcomputer 101 controls the respective motors of the lens drive mechanism 103 and the diaphragm drive mechanism 105 in response to the instruction from the body microcomputer 201.

The focus ring 106 is provided on the outer periphery of the lens barrel 100. The focus ring 106 can be rotated along the outer periphery of the lens barrel 100. The focus ring 106 is a member for manual focusing performed by a user. The rotation detection circuit 107 detects the rotation of the focus ring 106 to send the rotation detection signal to the lens microcomputer 101. When the focus ring 106 is operated to be rotated by a user, the rotation detection circuit 107 detects the rotation of the focus ring 106 to send the rotation detection signal to the lens microcomputer 101. The lens microcomputer 101 sends a lens drive signal, which corresponds to the rotation detection signal from the rotation detection circuit 107, to the lens drive mechanism 103. Thereby, the lens drive mechanism 103 moves the focus lens of the photographing optical system 102 in the direction parallel to the optical axis L.

The main mirror 202a, the pentprism 202b, and the eyepiece lens 202c are provided in the digital camera body 200. The main mirror 202a, the pentprism 202b, and the eyepiece lens 202c form a finder system. A portion of incident light flux is transmitted through the main mirror 202a, and the remaining incident light flux is reflected thereon. The main mirror 202a is provided to be rotatable around an axis n in a direction of arrow A. The main mirror 202a is usually located at a down position on the optical axis L. In the photographing, the main mirror 202a is located at an up position where the main mirror 202a is retracted from the optical axis L. In FIG. 2, the main mirror 202a is located at the down position. The main mirror 202a is provided with the sub mirror 203.

The main mirror 202a is driven by the mirror drive mechanism 207 to be rotated around the axis n in the direction of arrow A. The mirror drive mechanism 207 is controlled by the body microcomputer 201. When the main mirror 202a is moved to the up position, the sub mirror 203 is also retracted from the optical axis L.

When the main mirror 202a is located at the down position, the portion of the incident light flux having entered through the photographing optical system 102 is reflected to the pentaprism 202b side by the main mirror 202a to pass through the pentprism 202b and the eyepiece lens 202c, and, thus, to form an subject image for observation.

The photometric circuit 204 is provided adjacent to the pentprism 202b. The photometric circuit 204 has a photo sensor therein. The portion of the light flux having passed through the pentaprism 202b enters the photo sensor in the photometric circuit 204. The photometric circuit 204 performs well-known photometric processing on the basis of the light amount detected by the photo sensor. The photometric circuit 204 sends the result of the photometric processing to the body microcomputer 201.

The body microcomputer 201 calculates an exposure amount in photographing on the basis of the result of the photometric processing from the photometric circuit 204 to send the obtained exposure amount to the lens microcomputer 101. The lens microcomputer 101 receives the exposure amount in photographing from the body microcomputer 201 to drive and control the diaphragm 104 on the basis of the exposure amount in photographing.

The sub mirror 203 is provided in the main mirror 202a. The light flux, which has passed through the main mirror 202 and has been reflected on the sub mirror 203, is led to the AF sensor unit 205 for performing phase difference AF processing. The AF sensor unit 205 includes an area sensor. The light flux having entered the area sensor is converted to an electric signal. An output signal from the area sensor is sent to the body microcomputer 201 through the AF sensor drive circuit 206.

The body microcomputer 201 inputs the output signal from the area sensor to perform phase difference detection processing on the basis of the output signal from the area sensor, thereby calculating a focus condition (defocus amount) of the photographing optical system 102 necessary for the focus adjustment. The body microcomputer 201 sends the defocus amount of the photographing optical system 102 obtained by calculation to the lens microcomputer 101.

The lens microcomputer 101 receives the defocus amount from the body microcomputer 201 to calculate a movement amount of the focus lens of the photographing optical system 102 on the basis of the defocus amount, and, thus, to send an instruction corresponding to the obtained movement amount of the focus lens to the lens microcomputer 101. Thereby, the drive control of the focus lens based on the phase difference AF is performed.

As described above, when the main mirror 202a is located at the down position, the digital camera 300 performs auto-focusing based on the phase difference AF.

The digital camera 300 can perform manual focusing and auto-focusing by imager AF.

When a still image is taken, the main mirror 202a is retracted from on the optical axis L of the photographing optical system 102, and then moved to a predetermined up position. Also in manual focusing, the main mirror 202a is moved to the predetermined up position. Further, when an electronic viewfinder (EVF) display is performed in auto-focusing by imager AF, the main mirror 202a is moved to the predetermined up position.

As the main mirror 202a is moved to the up position, the light flux having passed through the photographing optical system 102 enters the shutter section 208. The imaging element 211 is disposed behind the shutter section 208. Thereby, the light flux having passed through the shutter section 208 enters the imaging element 211.

The shutter section 208 is a shutter of a focal plane system and constituted of a preceding screen and a succeeding screen. A spring force for driving the preceding screen and the succeeding screen is accumulated by the shutter charge mechanism 209. The shutter control circuit 210 drives the preceding screen and the succeeding screen. The shutter charge mechanism 209 and the shutter control circuit 210 are respectively controlled by the body microcomputer 201.

The imaging element 211 converts a subject image formed on an imaging surface to an image signal. For example, a release, which is one of camera manual operation switches, is operated to take a still image, the image signal output from the imaging element 211 is read frame by frame by the interface circuit 212 in the release operation to be digitalized. Thereby, the image signal output from the imaging element 211 is obtained as image data. The image data is stored in the buffer memory 214, constituted of, for example, an SDRAM, by the image processing controller 213. The buffer memory 214 is a memory for temporarily storing data such as image data, and used for a work area when various forms of processing are applied to the image data.

The image data temporarily stored in the buffer memory 214 is read by the image processing controller 213. The image processing controller 213 applies well-known image processing, such as white balance correction, gradation correction, and color correction, to the read image data, and thereafter performs compression processing on the image data by a well-known compression method such as a JPEG method.

Further, on the basis of the image data output from the imaging element 211 for example, the image processing controller 213 repeatedly obtains the focus evaluation value, which represents focus condition of the focus lens in the photographing optical system 102 to the subject image.

The image data compressed by the compression method such as the JPEG method is stored in the buffer memory 214 by the image processing controller 213. Thereafter, the image processing controller 213 adds predetermined header information to the compressed image data to record the predetermined header information, which is a file of the compressed image data, into a flash ROM 215 or a recording medium 216.

For example, the flash ROM 215 is assumed to be a memory built in the digital camera 300. The recording medium 216 is assumed to be removably attached to the digital camera 300. As the recording medium 216, for example, a memory card or a hard disk drive capable of being attached to and detached from the digital camera 300 is used.

The image from the file of the compression image data is reproduced as follows. The image processing controller 213 reads the image data, which is recorded in the flash ROM 215 or the recording medium 216 and has been compressed in a JPEG format, to expand the image data. Thereafter, the image processing controller 213 converts the expanded image data into a video signal to change the video signal to a predetermined size for display, thereby displaying the video signal having the predetermined size on the liquid crystal monitor 217.

When the EVF display is performed, the interface circuit 212 reads the image signal output from the imaging element 211 frame by frame at every predetermined timing to digitalize the image signal, thereby obtaining the image data. The image processing controller 213 applies the image processing to the image data obtained by the interface circuit 212 to display the image data as through moving images on the liquid crystal monitor 217.

The nonvolatile memory 218 is connected to the body microcomputer 201. The body microcomputer 201 can access the nonvolatile memory 218. The nonvolatile memory 218 is a rewritable EEPROM, for example. The nonvolatile memory 218 stores a predetermined control parameter, a control program, and the like necessary for controlling the digital camera 300.

The battery 220 as a power source is connected to the body microcomputer 201 through a power circuit 219. The voltage of the battery 220 is converted to a voltage necessary for each part of the digital camera 300 through the power circuit 219. Each of the converted voltages is supplied to each part of the digital camera 300.

The operation display LCD 221 and the camera operation switch 222 are connected to the body microcomputer 201. The operation display LCD 221 is used for informing the operation condition of the digital camera 300 to a user by a display output. The camera operation switch 222 is used when a user instructs the manual operation to each part of the digital camera 300.

When the EVF display is performed, the image processing controller 213 reads the electrical signal output from the imaging element 211 frame by frame at every predetermined timing to convert the electrical signal to a digital signal, and thus, to generate reduced image data from the digitalized image data. The image processing controller 213 applies the image processing such as the white balance correction to the reduced image data for the EVF display purpose, and thereafter converts the image data to the video signal. The image processing controller 213 then displays the video signal as a through image on the liquid crystal monitor 217.

When the through image is displayed, the following operation control is performed.

The main mirror 202a is first moved to the up position, whereby the shutter section 208 is in a released state. Thereby, the light flux having entered from the photographing optical system 102 directly enters the imaging element 211. The imaging element 211 performs photographing operation at a predetermined frame rate (the number of photographing images per second) to output the image signal. The image processing controller 213 reads the image signal output from the imaging element 211 frame by frame at a predetermined timing to digitalize the image signal, and thus, to obtain the image data. The image processing controller 213 further converts the image data to the video signal to change the size of the video signal in a predetermined size for display, and displays the video signal having the predetermined size on the liquid crystal monitor 217.

The user visually observes the through image displayed on the liquid crystal monitor 217, whereby the user can observe the subject image without looking through the eyepiece lens 202c. Hereinafter, a mode for displaying the through image is referred to as a live view mode.

Manual focusing and auto-focusing by imager AF are performed in the digital camera 300, which is set in the live view mode. The user can perform the focusing operation by manual focusing while looking at the image displayed on the liquid crystal monitor 217. Additionally, imager AF is also performed in the live view mode.

Meanwhile, in the digital camera 300, when the main mirror 202a is moved to the down position, it is possible to realize auto-focusing by the phase difference AF. Various focus modes of the digital camera 300 will be hereinafter described.

Figure 3:
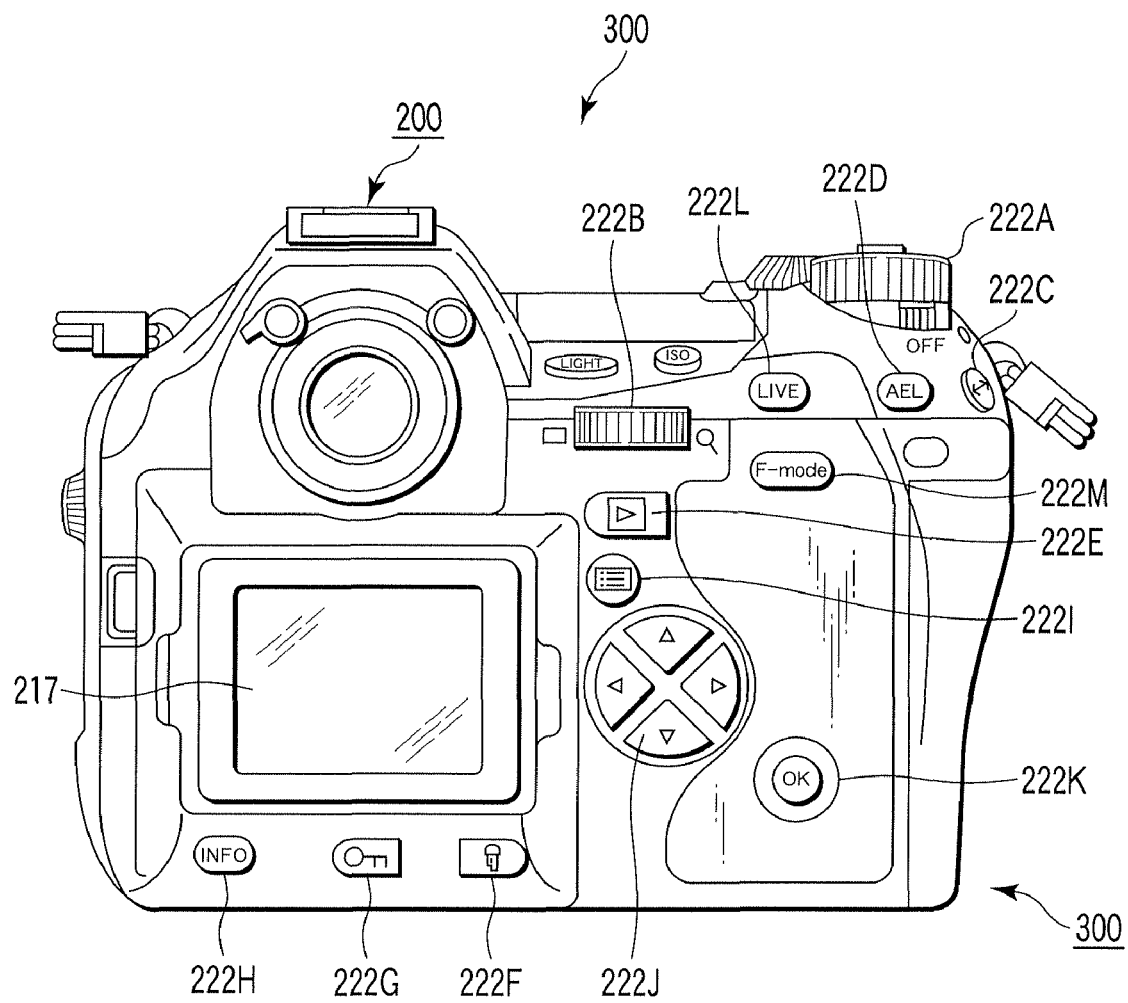
FIG. 3 is a back view of a main body of the digital camera.

FIG. 3 is a back view of the digital camera body of the digital camera 300. The digital camera body 200 is provided with the liquid crystal monitor 217 and the camera operation switch 222. The camera operation switch 222 has a plurality of operation switches. For instance, the camera operation switch 222 has a mode dial 222A, a main dial 222B, an AF frame button 222C, an AE lock button 222D, a reproducing mode button 222E, a deletion button 222F, a protect button 222G, an information display button 222H, a menu button 222I, an arrow button 222J, an OK button 222K, a live button 222L, a focus mode button 222M, and the like.

The mode dial 222A of the above operation switches is provided in the upper part of the digital camera body 200. The other operation switch group is provided on the back surface of the digital camera body 200.

The main dial 222B is operated to be rotated by a user to change a setting of a function relating to any of the operation switches of the camera operation switch 222, which is pressed and operated by the user.

The mode dial 222A is used for setting various photographing modes. Here, the mode dial 222A will be explained by using a scene mode (SCN) as an example of the various photographing modes.

When the main dial 222B is operated to be rotated by a user in such a state that the mode dial 222A is set in the scene mode, the body microcomputer 201 displays a menu screen relating to a setting of the photographing condition according to an intended scene on the liquid crystal monitor 217 through the image processing controller 213. The intended scene includes portrait scene, sports scene, commemorative photographing scene, landscape scene, and night view scene. The body microcomputer 201 sets the various photographing conditions in photographing such as exposure flash emission, a photometric mode, an AF method, and a continuous photographing interval, in response to the scene selected by the user from among the above scenes.

The AF frame button 222C is used for selecting the AF method in photographing. When the main dial 222B is dial-operated in such a state that the AF frame button 222C is pressed, the body microcomputer 201 changes the AF method to, for example, multi-AF or spot AF. Multi-AF detects each focus condition of a plurality of ranging points in a screen provided by the image signal, which is obtained by imaging by the imaging element 211. The spot AF detects the focus condition of one point (which can be selected from a plurality of candidates) in the same screen.

The AE lock button 222D is a button for fixing exposure condition. While the AE lock button 222D is pressed and operated, the body microcomputer 201 fixes the exposure amount being calculated therein.

The reproducing mode button 222E is a button for switching the operation mode of the digital camera 300 between the reproducing mode and the photographing mode. In the reproducing mode, an image from the image file, which is recorded in the flash ROM 215 or the recording medium 216 and has been compressed by the compression method such as the JPEG method, is reproduced and displayed on the liquid crystal monitor 217.

The deletion button 222F is a button for deleting the image data, having been compressed by the compression method such as the JPEG method, from the flash ROM 215 or the recording medium 216 in the reproducing mode.

The protect button 222G is a button for protecting the image data so as to prevent the image data from being accidentally deleted from the flash ROM 215 or the recording medium 216 in the reproducing mode.

The information display button 222H is a button for displaying additional information of the image data, for example Exif information, on the liquid crystal monitor 217.

The menu button 222I is a button for displaying a menu screen on the liquid crystal monitor 217. The menu screen has, for example, a plurality of menu items having a hierarchical structure. A user operates the arrow button 222J whereby the user can select a predetermined menu item. The selected menu item can be determined by operating the OK button 222K. For example, the menu item includes a photographing menu, a custom menu, and a set up menu. The photographing menu can realize the settings of set up of the flash ROM 215 or the recording medium 216, an image quality of the image data, the image processing, the scene mode, and the like. The custom menu can realize the various detailed settings according to the photographer's taste. The set up menu sets the operation condition of a camera, such as types of alarm sounds.

The live button 222L is a button for selecting the live view mode where the through image is displayed. When the digital camera 300 is not in the live view mode (hereinafter referred to as non-live view mode), if the live button 222L is pressed and operated by a user, the body microcomputer 201 enters the live view mode. Thereby, the body microcomputer 201 starts the display of the through image on the liquid crystal monitor 217. Thereafter, when the live button 222L is again pressed and operated by the user, the body microcomputer 201 finishes the live view mode, whereby the digital camera 300 is in a non-live view mode where the through image is not displayed.

In the live view mode, the main mirror 202a is located at the up position. At this time, the light flux does not enter the AF sensor unit 205. Thereby, the phase difference AF processing becomes impossible.

When the digital camera 300 is in the live view mode, the body microcomputer 201 is switched from a phase difference AF operation condition (phase difference AF mode) to an MF operation condition (MF mode).

When the focus mode button 222M is pressed, the operation is different between when the digital camera 300 is in the live view mode and when it is in the non-live view mode. In the live view mode, when the focus mode button 222M is pressed and operated, the body microcomputer 201 switches the focus control to fully MF or partial MF which is normal manual focusing. In the partial MF, after a predetermined operation is performed by the normal manual focusing, imager AF is performed while keeping the live view mode.

Meanwhile, when the digital camera 300 is in the non-live view mode, if the focus mode button 222M is pressed and operated, the body microcomputer 201 switches the focus control to single AF or continuous AF. In single AF, the focus is locked to the phase difference AF performed in the non-live view mode after focusing. In continuous AF, AF operation is always repeated. The details of single AF and continuous AF will be described hereinafter.

When each switch of the camera operation switch 222 is operated by a user, the body microcomputer 201 stores the contents set by the operation in the buffer memory 214, the memory in the body microcomputer 201, or the like.

The digital camera 300 has a release button which is a normal two-step switch. In the release button, an on-state of a first step of the two-step switch is supposed as a state that a first release switch is closed. Such a state is referred to as release half-press. Meanwhile, an on-state of a second step of the two-step switch is supposed as a state that a second release switch is closed. Such a state is referred to as release full-press.

The digital camera 300 is provided with the focus mode button 222M for selecting the focus mode, the live button 222L for switching between the live view mode and the non-live view mode, the reproducing mode button 222E for switching the mode of the digital camera 300 to the photographing mode or the reproducing mode, and various other buttons for setting. In FIG. 3, the settings by the buttons of the camera operation switch 222 except the focus mode button 222M, the live button 222L, and the reproducing mode button 222E are omitted for ease of explanation.

For example, the body microcomputer 201 executes the control program stored in the nonvolatile memory 218, whereby the body microcomputer 201 has functions of a manual focus controller, a focus evaluation value change detection section, an auto focus controller, a switching section, a setting section, a indicator production section, an image adding section, and a display format controller.

The control program makes the imaging element 211 repeat a continuous taking of a subject at every predetermined time, makes the focus evaluation value calculation section 2A repeat the calculation of the focus evaluation value, representing the focus condition of the taking lens, on the basis of the image signal output from the imaging element 211, and makes the manual focus controller perform manual focusing, in which the focus lens in the photographing optical system 102 is moved in response to the operation from the outside. Further, the control program makes the focus evaluation value change detection part detect the change in the focus evaluation value generated by the movement of the focus lens in the optical system 102. When a predetermined change in the focus evaluation value is detected in manual focusing, the control program selects at least one of a first mode in which manual focusing is continued and a second mode for making the transition to auto-focusing, in which the focus lens in the photographing optical system 102 is automatically moved such that the focus evaluation value is the peak value. When a predetermined change in the focus evaluation value is detected in a case in which the second mode has been selected, the transition to auto-focusing is automatically performed, and then the focus lens in the photographing optical system 102 automatically moved such that the focus evaluation value is the peak value.

The manual focus controller receives the operation from the outside to control the lens drive mechanism 103, and thus to move the focus lens in the photographing optical system 102 in the direction parallel to the optical axis L.

The focus evaluation value change detection section sequentially receives the focus evaluation value, which is obtained by the image processing controller 213 when the focus lens in the photographing optical system 102 is being moved, and detects the change in the focus evaluation value. For example, the focus evaluation value change detection section detects that the focus evaluation value has changed beyond the peak value as the predetermined change in the focus evaluation value at the time when the focus lens in the photographing optical system 102 has been moved by the manual focus controller.

The auto focus controller controls the lens drive mechanism 103 in accordance with the change in the focus evaluation value detected by the focus evaluation value change detection section, and moves automatically the focus lens in the photographing optical system 102 to be in the focusing state.

When the focus evaluation value change detection section detects a predetermined change in the focus evaluation value, the switching section switches the control of the lens drive mechanism 103 from a manual focus controller to an auto focus controller. For example, when the focus evaluation value change detection section detects that the focus evaluated value has changed beyond the peak value, the switching part automatically switches the control of the lens drive mechanism 103 from the manual focus controller to the auto focus controller.

When the focus lens in the photographing optical system 102 is moved by the control of the manual focus controller, even if the focus evaluation value, detected by the focus evaluation value change detection section, has changed beyond the peak value, the setting section realizes a setting in which the control to the lens drive mechanism 103 is not switched to the auto focus controller.

The indicator production part produces indicator for displaying the focus evaluation value as a graphic image. For example, the indicator production section has a focus meter 217B which is the indicator and displays therein a bar-like display bar 217B1 shown in FIG. 14. The display bar 217B1 can change its length in accordance with the focus evaluation value.

Figure 14:
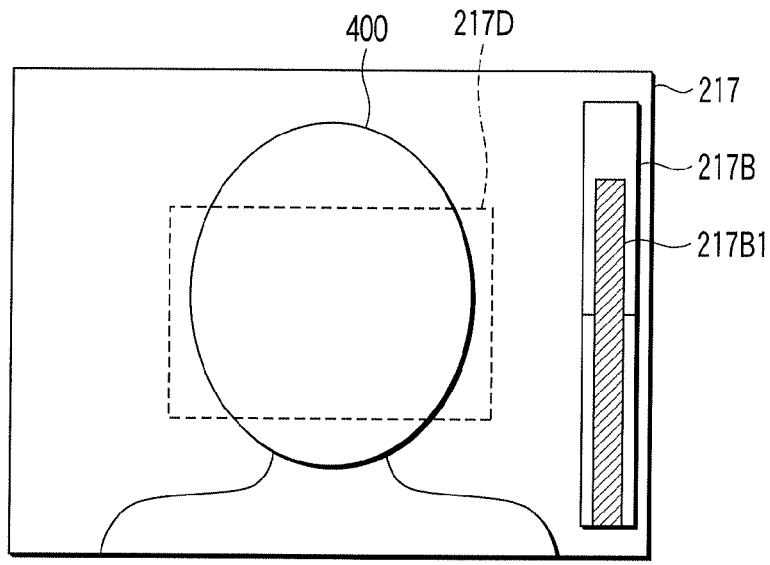
FIG. 14 is a view showing a display example of a liquid crystal monitor during MF operation in the digital camera.

The image adding section adds, for example, the focus meter 217B, which displays therein the indicator produced by the indicator production section, such as the bar-like display bar 217B1 shown in FIG. 14, to the live image data of the subject.

Figure 16:
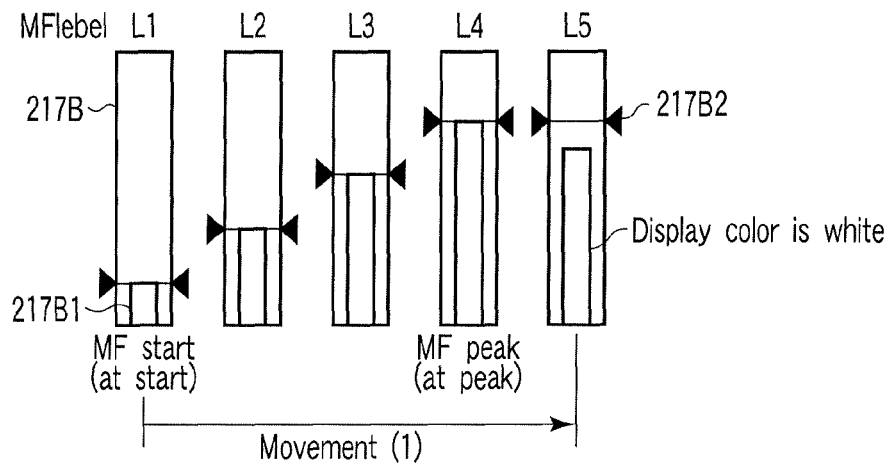
FIG. 16 is a view showing a change of a focus meter in a first lens movement of a focus lens in the digital camera.

For example, the display format controller controls the display format of the focus meter 217B displaying the display bar 217B1 therein. For example, when the focus lens in the photographing optical system 102 is moved by the manual focus controller, and the focus evaluation value change detection section detects that the focus evaluation value has changed beyond the peak value, the display format controller displays a predetermined mark, for example a peak hold mark 217B2 as shown in FIG. 16, at a position on the focus meter 217B corresponding to the peak focus evaluation value.

Figure 17:
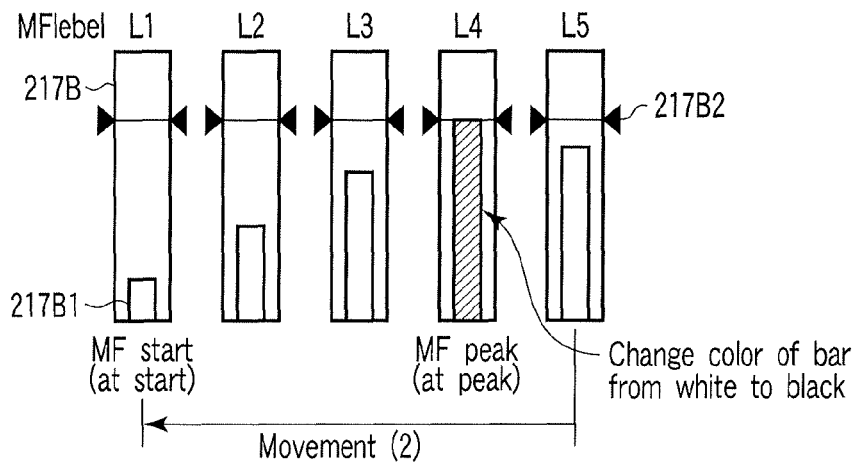
FIG. 17 is a view showing the change of the focus meter in a second lens movement of the focus lens in the digital camera.

When the focus evaluation value again coincides with the peak value in a case in which the lens drive mechanism 103 is controlled by the manual focus controller, the display format controller changes the display format of the focus meter 217B. For example, as shown in FIG. 17, the display format controller changes a color of the display bar 217B1 as the change in the display format of the focus meter 217B.

The display format controller displays the peak hold mark 217B2 on the focus meter 217B, and holds the peak hold mark 217B2 at the peak position of the focus evaluation value even when the focus evaluation value has changed beyond the peak value.

Next, the operation of the digital camera 300 which is configured as described above will be explained with reference to a main flowchart showing from starting to finishing of the photographing mode shown in FIG. 4.

When the reproducing mode button 222E is operated by a user immediately after the activation of the digital camera 300 or during the reproducing mode, the digital camera 300 is operated in the photographing mode.

The body microcomputer 201 first determines whether it is immediately after the activation of the digital camera 300 in step S10. When it is determined that the digital camera 300 has been just activated, the body microcomputer 201 transfers to step S12 to initialize the photographing mode. The initialization of the photographing mode is performed in accordance with a photographing mode initialization flowchart shown in FIG. 5. The details of the operation of the photographing mode initialization will be described later.

As for the reasons for initializing the photographing mode, various flags showing a state of the digital camera 300 do not have a specified value immediately after the activation, whereby it is necessary to give a default initialization value to the various flags. After passing through step S12, the body microcomputer 201 sets the operation in the photographing mode in the non-live view mode.

When the transition from the photographing mode to the reproducing mode is performed, the body microcomputer 201 transits to the non-live view mode, and thereafter transits to the reproducing mode. The live view mode and the non-live view mode represent the operation in the photographing mode, and do not affect the reproducing mode. Meanwhile, the values of the various flags to be hereinafter described are not changed in the reproducing mode.

Meanwhile, when it is not determined that the digital camera 300 has been just activated, the body microcomputer 201 transfers to step S14 to determine whether the digital camera 300 is in the live view mode (flag: "flag_state"="live"). The body microcomputer 201 represents various conditions in the photographing mode as the value of the flag. For instance, when the condition in the photographing mode is in the live view mode state, the value of the flag: "flag_state" is "live". When the condition in the photographing mode is in the non-live view mode state, the value of the flag: "flag_state" is "non-live".

When the value of the flag: "flag_state" is "live", the body microcomputer 201 transfers from step S14 to step S16 to perform the starting operation of the live view mode. The starting operation of the live view mode is performed in accordance with a live view mode starting operation flowchart shown in FIG. 6. The details of the live view mode starting operation will be described later.

Meanwhile, when the value of the flag: "flag_state" is "non-live", the body microcomputer 201 transfers from step S14 to step S16A.

Hereinafter, the operation of the live view mode will be described.

Next, when the body microcomputer 201 performs the starting operation of the live view mode in step S16, the imaging section 1 takes a subject to output the image signal. Thereby, a live image of the subject taken by the imaging section 1 is displayed on the liquid crystal monitor 217 of the back face of the digital camera 300.

Subsequently, the body microcomputer 201 switches the focus control to the MF mode in step S18. In the MF mode, MF is selected by the AF/MF switching section 3A in the focus control section 3, and the lens control section 4 is controlled by the MF control section 3C. When the focus control is already in the MF mode, the MF mode is selected by the AF/MF switching section 3A whereby step S18 is skipped.

In the digital camera 300 of the invention, it is possible to select any of the fully MF and the partial MF by operating the focus mode button 222M in the live view mode. Also in the case where the partial MF has been selected, the body microcomputer 201 controls the focus in the MF mode until the change in the focus evaluation value satisfies a predetermined condition.

Next, in step S22, the body microcomputer 201 detects button operation processing A, that is, a button operated by a user. Specifically, the body microcomputer 201 detects the button operation in the reproducing button 222E, the live button 222L, or the focus mode button 222M. When the button operation is performed while a photographer manually performs the focusing operation in the MF mode, the button operation processing A is performed as an interrupt operation. The button operation processing A is performed in accordance with a flowchart of button operation processing A shown in FIG. 7. The details of the operation of the button operation processing A will be described later.

Next, the body microcomputer 201 determines whether the release is fully pressed in step S24. When it is determined that the release is fully pressed, the body microcomputer 201 transfers to step S44 to perform a finishing operation of the live view mode, and then transfers to the next step S46 to perform the sill image taking.

In a case in which the fully MF is set, the release is fully pressed when the user determines that the focusing is completed. Thus, the determination in step S24 is a processing for determining whether the operation for taking a still image is performed during the operation of MF. Even when the partial MF is selected, the full-press operation of the release is determined in step S24 during the operation in the MF mode.

Meanwhile, when the release is not fully pressed, the body microcomputer 201 transfers to step S26 to perform a processing of the focusing operation by MF by the user. Incidentally, even when the fully MF is selected as the MF mode, or even when the partial MF is selected, the body microcomputer 201 performs the processing of the focusing manual operation by MF by the user in step S26 to return to the main flowchart shown in FIG. 4. The processing of MF is performed in accordance with a processing flowchart of MF shown in FIG. 8. The details of the processing of MF will be described later.

In step S26, when it is determined that the focus evaluation value obtained by the image processing controller 213 temporarily changed beyond the peak value, the body microcomputer 201 sets a value "1" to "flag_peak".

Next, in step S28, the body microcomputer 201 determines whether the selected MF mode is the partial MF. The body microcomputer 201 has a flag: flag_MF mode, for determining whether the MF mode is the fully MF or the partial MF. The flag_MF mode can take two values, "full" and "semi". "full" corresponds to the fully MF, while "semi" corresponds to the partial MF.

When the fully MF is selected as the MF mode, "full" is set in the flag_MF mode. Thereby, the body microcomputer 201 returns to step S22.

Meanwhile, when the partial MF is selected, the flag_MF mode is "semi", whereby the body microcomputer 201 transfers to step S30. Namely, when the fully MF is set, the body microcomputer 201 transits to the reproducing mode or the non-live view mode by the button operation in step S22. Additionally, when the fully MF is set, the body microcomputer 210 determines the full pressing of the release in step S24 to repeat the processing from step S22 to step S28 until the transfer to step S44.

Next, the body microcomputer 201 determines whether "flag_peak"=1 in step S30. Namely, the body microcomputer 201 determines whether the focus evaluation value changed beyonds the peak value during the processing of MF whereby "1" is set to "flag_peak". As the determination result, when "flag_peak" is not "1", the body microcomputer 201 returns to step S22. Meanwhile, when "flag_peak"=1, the body microcomputer 201 transfers to step S32.

Next, the body microcomputer 201 switches the focus control from the MF mode to an imager AF mode in step S32. Namely, the lens control section 4 shown in FIG. 1 switches the MF control section 3C to the imager AF control section 3B.

Next, the body microcomputer 201 performs the focusing operation by imager AF in step S34. In this embodiment, when the focusing is performed in imager AF, it is assumed that the body microcomputer 201 locks the focusing. Namely, once the body microcomputer 201 determines that the focusing is completed to stop the driving of a lens of the photographing optical system 102, the body microcomputer 201 keeps the stop state even if the focus evaluation value is changed. Note that the processing of imager AF is performed in accordance with a processing flowchart of imager AF shown in FIG. 9. The details of the processing of imager AF will be described later.

Next, in step S38, the body microcomputer 201 detects the operation of the reproducing button 222E, the live button 222L, or the focus mode button 222M by a button operation processing B. The button operation processing B is performed in accordance with a flowchart of the button operation processing B shown in FIG. 10. The details of the button operation processing B will be described later.

Next, the body microcomputer 201 determines whether the release button is fully pressed in step S40. When it is determined that the release button is not fully pressed, the body microcomputer 201 returns to step S38 to repeat steps S38 and S40.

Meanwhile, when the release button is fully pressed, the body microcomputer 201 finishes the live view mode in step S44, and performs the operation control of the still image taking in step S46. When the still image taking is finished, the body microcomputer 201 returns to step S14. The finish processing of the live view mode is performed in accordance with a finish processing flowchart of the live view mode shown in FIG. 11. The details of the finish processing of the live view mode will be described later. The still image taking is performed in accordance with a flowchart of the still image taking shown in FIG. 12. The details of the still image taking processing will be described later.

If both the button operation processing A (step S22) and the button operation processing B (step S38) are not performed, the body microcomputer 201 keeps "flag_state"="live". When there is the value: "live", the body microcomputer 201 transfers from step S14 to step S16 to perform the starting operation of the live view mode, and thus to repeat the above series of flow. The body microcomputer 201 then returns to the state before the still image taking.

Next, the operation of the non-live view mode will be explained.

When it is determined that the digital camera 300 is in the non-live view mode state in step S14, the body microcomputer 201 transfers to step S16 to perform a button operation processing C. When the digital camera 300 is in the non-live view mode state, the value of the flag: "flag_state" is "non-live". The body microcomputer 201 determines that the digital camera 300 is in the non-live view mode state on the basis of the value: "non_live" of the flag: "flag_state".

The button operation processing C detects whether the reproducing mode button 222E, the live button 222L, or the focus mode button 222M is pressed and operated by a user, as with the button manual operation processing A and B in the MF mode (steps S20 and S36). The button operation processing C is performed in accordance with a flowchart of the button operation processing C shown in FIG. 13. The details of the button operation processing C will be described later.

Next, the body microcomputer 201 determines whether the release is half pressed by a user in step S18A. When it is determined that the release is not half pressed, the body microcomputer 201 returns to step S18A.

When the release is half pressed, the body microcomputer 201 transfers to step S20A to perform the focusing operation by the phase difference AF.

When the focusing operation is finished, the body microcomputer 201 then transfers to step S22A to determine whether the release is released. When it is determined that the release is released, the body microcomputer 201 returns to step S16A.

When the release is not released, the body microcomputer 201 transfers to step S24A to perform the button operation processing C. In the button operation processing C, any operation of the reproducing mode button 222E, the live view button 222L, and the focus mode button 222M is detected by the user.

Next, the body microcomputer 201 determines whether the release is fully pressed in step S26A. When it is determined that the release is fully pressed, the body microcomputer 201 transfers to step S46 to perform the operation control of the still image taking in a focusing state obtained by the phase difference AF. The focusing state by the phase difference AF has been obtained in step S20A.

Meanwhile, when the release is not fully pressed, the body microcomputer 201 transfers from step S26A to step S28A to determine whether the phase difference AF mode is continuous AF.

As with the flag: flag_MF mode corresponding to the MF mode, the phase difference AF mode has a flag: flag_AF mode. The flag_AF mode is one of the above-mentioned various flags. The flag_AF mode takes the values: "continuous" and "single". When the flag_AF mode is "continuous", it is shown that the phase difference AF mode is continuous AF. When the flag_AF mode is "single", it is shown that the phase difference AF mode is a single AF.

When the body microcomputer 201 determines the value of the flag_AF mode in step S28A, if the flag_AF mode is "continuous", the body microcomputer 201 determines that the phase difference AF mode is continuous AF to return to step S20A, and thus to continuously perform the focusing operation of the phase difference AF.

When the flag_AF mode is "single", the body microcomputer 201 determines that the phase difference AF mode is the single AG to transfer to step S22A. Thereafter, the body microcomputer 201 repeats from step S22A to step S28A. Namely, the body microcomputer 201 does not perform the phase difference AF processing in step S20A. Thereby, the focus is locked. The body microcomputer 201 is in a standby state until the release is released in step S22, the button operation is detected in step S24A, or the full pressing of the release is detected in step S26A.

If the button operation is not detected in steps S16A and S24A, the body microcomputer 201 keeps the value: "non-live" of the flag: "flag_state" in the non-live view mode state. Thereby, the body microcomputer 201 keeps the non-live view mode even when the body microcomputer 201 returns to step S14 after the finish of the still image taking in step S46, and returns to a state before the still image taking even when the sill image taking is performed through the phase difference AF.

Next, the initialization of the photographing mode (step S12) will be described with reference to the photographing mode initialization flowchart shown in FIG. 5.

First, the body microcomputer 201 sets an initial value to the various flags in steps from S12A01 to S12A03. Namely, in step S12A01, the body microcomputer 201 sets the flag in the live non-view mode: "flag_state"="non-live".

In step S12A02, the body microcomputer 201 sets the flag for determining whether the MF mode is the fully MF or the partial MF: flag_MF mode, such that "flag_AF mode"="full". "full" corresponds to the fully MF.

The body microcomputer 201 then sets the flag in the phase difference AF mode: flag_AF mode to "single" in the step 12A03. When the flag_AF mode is "single", the phase difference AF mode is single AF.

These flags, that is, the flag in the non-live view mode: "flag_state" and the flag for determining whether the MF mode is the fully MF or the partial MF: flag_MF mode, and the flag in the phase difference AF mode: flag_AF mode are one example. For instance, a user selects a menu item displayed by the operation of the menu button 222I whereby the user can set the default initial value in the initialization of the photographing mode. In the digital camera 300, it is possible to start a flow of a taking condition in such a state that the flag is coincided with the default initial value.

Next, the starting operation of the live view mode (step S16) will be described in accordance with the starting operation flowchart of the live view mode shown in FIG. 6.

In the initial state before the starting operation of the live view mode, the main mirror 202a is located at the down position, as shown in FIG. 2.

The body microcomputer 201 first drives the mirror drive mechanism 207 to move the main mirror 202a to the up position in step S1601.

The body microcomputer 201 then drives the shutter control circuit 210 to open the shutter section 208 in step S1602. Thereby, a light flux having passed through the photographing optical system 102 enters the imaging element 211.

The imaging element 211 starts to obtain the image data at a predetermined frame rate in step S1603. The image signal output from the imaging element 211 is read frame by frame to be digitalized by the interface circuit 212, and thus to be obtained as the image data. The image data is stored in the buffer memory 214, constituted of for example an SDRAM, by the image processing controller 213.

Subsequently, in step S1604, the image processing controller 213 reads the image data stored in the buffer memory 214, for example, to start the display of the through image displayed on the liquid crystal monitor 217.

Figure 7:
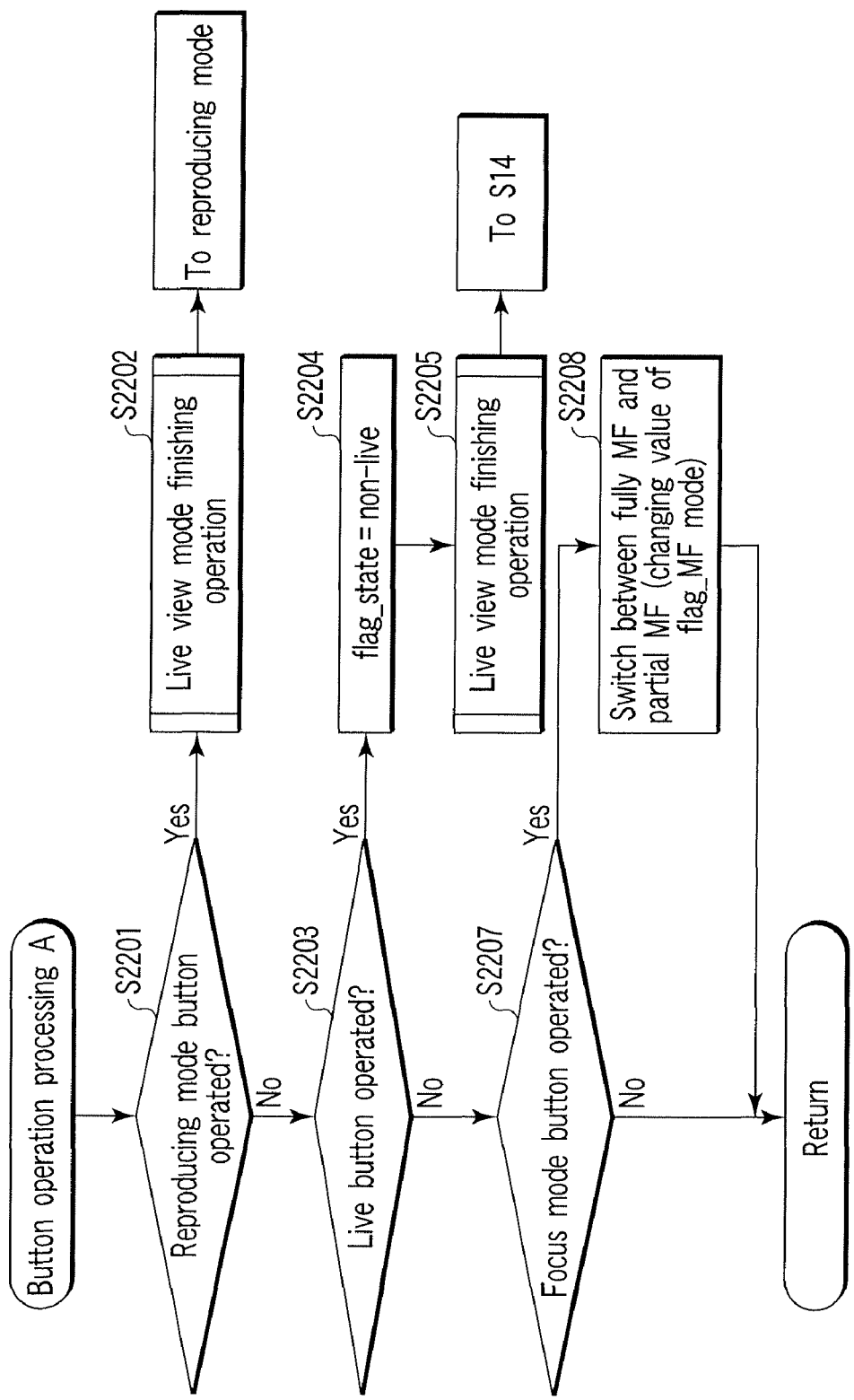
FIG. 7 is a flowchart of a button operation processing A in the digital camera.

Next, the button operation processing A (step S22) will be described in accordance with the flowchart of the button operation processing A shown in FIG. 7.

First, the body microcomputer 201 determines whether the reproducing button 222E has been operated in step S2201. When it is determined that the reproducing button 222E has been operated, the body microcomputer 201 transfers to step S2202 to perform the finishing operation of the live view mode before transition to the reproducing mode. The finishing operation of the live view mode is performed by the same processing as that in step S44. In the reproducing mode, since the lens control section 4 does not need to be controlled, the control by the MF control section 3C may be released. After the live view mode finishing operation is finished, the digital camera 300 transits to the reproducing mode.

Meanwhile, when the reproducing button 222E is not operated, the body microcomputer 201 transfers to step S2203 to determine whether the live button 222L has been operated. When it is determined that the live button 222L has been operated, the body microcomputer 201 transfers to step S2204 to set the flag in the non-live view mode: "flag_state"="non-live".

Next, the body microcomputer 201 performs the finishing operation of the live view mode in step S2205. The processing in step S2205 is the same as that in step S44.

Thereafter, the body microcomputer 201 proceeds to step S14.

When the live button 222L is not operated, the body microcomputer 201 transfers from step S2203 to step S2207 to determine whether the focus mode button 222M has been operated. When it is determined that the focus mode button 222M has been operated, the body microcomputer 201 transfers to step S2208 to switch the flag for determining whether the MF mode is the fully MF or the partial MF: flag_MF mode. Namely, when the flag_Mf mode is "semi" representing the partial MF at the present moment, the body microcomputer 201 switches the flag: flag_MF mode to "full" representing the fully MF. Meanwhile, when the flag: flag_Mf mode, is "full" at the present moment, the body microcomputer 201 switches the flag: flag_MF mode, to "semi".

Figure 4:
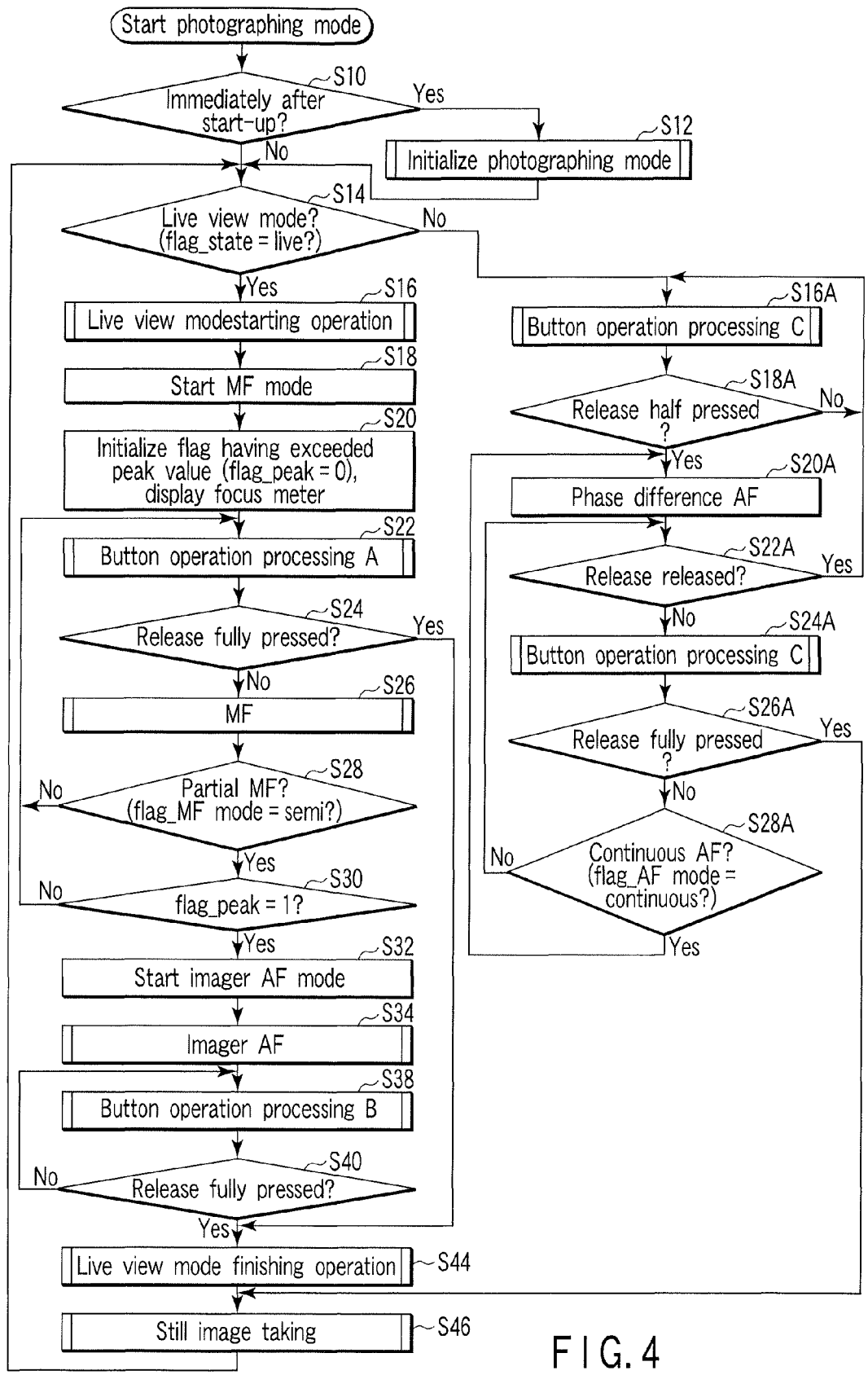
FIG. 4 is a main flowchart showing from starting to finishing of a photographing mode in the digital camera.

When the focus mode button 222M is not operated, the body microcomputer 201 returns to the main flowchart shown in FIG. 4.

Figure 8:
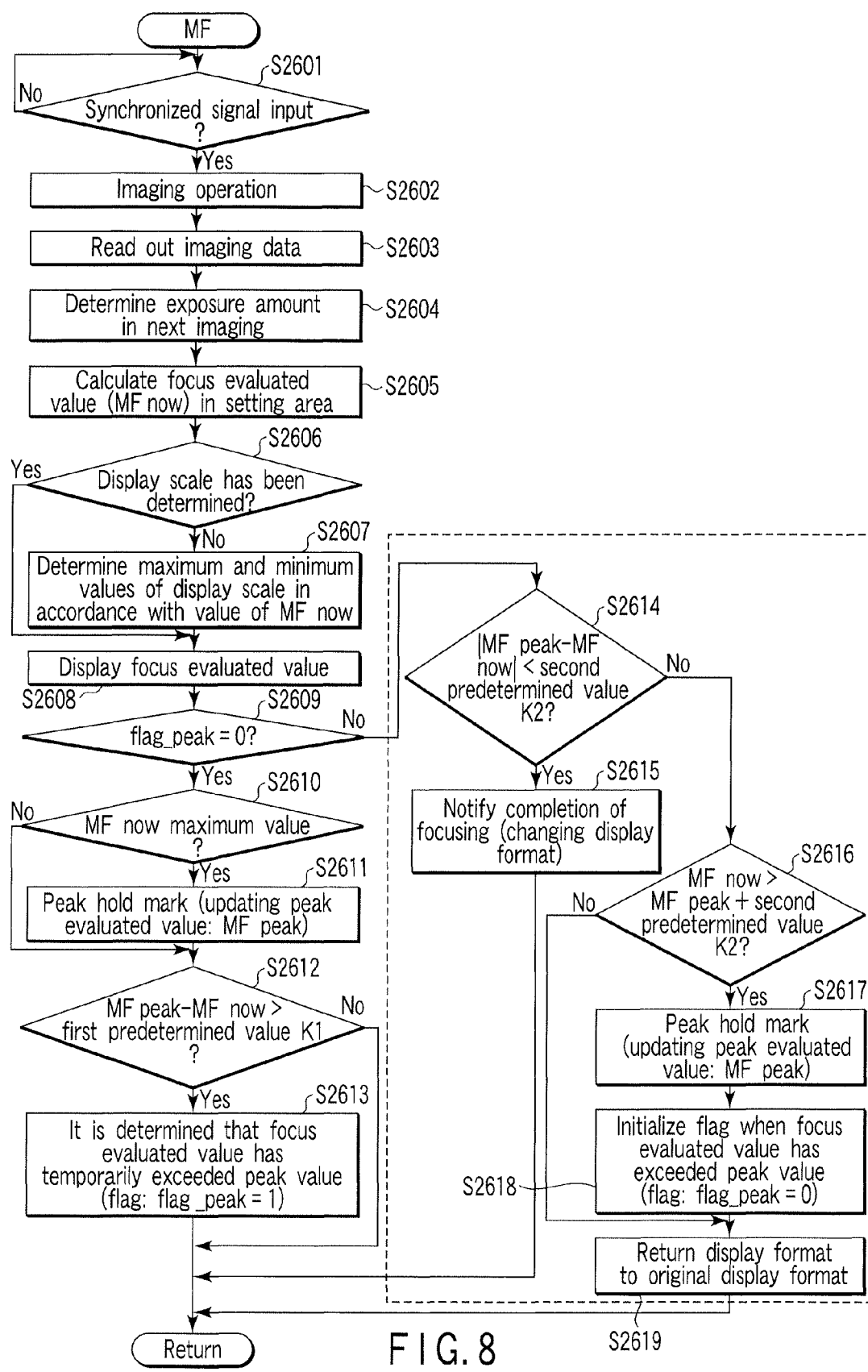
FIG. 8 is a processing flowchart of MF in the digital camera.

Next, MF (step S26) will be described in accordance with the flowchart of the focusing operation by MF shown in FIG. 8.

The operation in the focusing operation by MF forms a loop with the button operation processing A (step S22) and the determination of the release full-press (step S24). In the operation in the focusing operation by MF, the pressing operation of the release and the button operation can be accepted during MF operation.

The body microcomputer 201 first determines whether a synchronization signal is input into the imaging element 211 in step S2601. Namely, the body microcomputer 201 is in a standby state until the synchronization signal is input into the imaging element 211. The synchronization signal is input into the imaging element 211 through the interface circuit 212. The imaging element 211 is driven at a predetermined interval in accordance with the synchronization signal to output the image signal. For instance, when the frame rate is 30 frame/second, the synchronization signal of 30 times per one second is input into the imaging element 211 at an equal interval, for example at every about 33.33 ms, through the interface circuit 212.

Next, when the synchronization signal is input into the imaging element 211, in step S2602 the interface circuit 212 performs the accumulation of the electric charge of the image signal having been output from the imaging element 211.

Next, when the accumulation of the electric charge by the interface circuit 212 is finished, in step S2603 the interface circuit 212 reads the image data. The image processing controller 213 stores the image data in the buffer memory 214 such as an SDRAM.

Next, in step S2604 the image processing controller 213 reads the image data stored in the buffer memory 214 such as an SDRAM to obtain an automatic exposure (AE) evaluation value for evaluating the exposure for the image data, and thus to obtain an exposure amount in the next driving of the imaging element 211 on the basis of the AE (automatic exposure) evaluation value.

The imaging element 211 mounts a well-known electronic shutter function. In step S2604, the body microcomputer 201 sets an electric charge accumulation time in the imaging element 211 on the basis of the exposure amount in the next driving of the imaging element 211.

Figure 15:
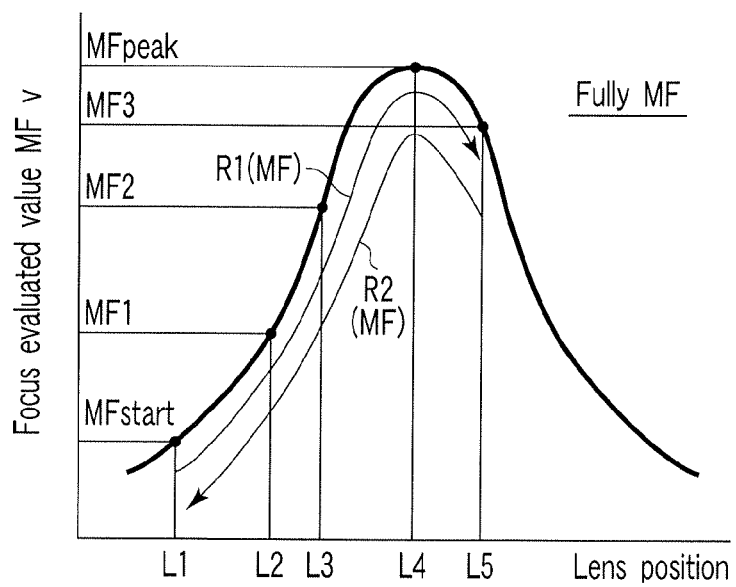
FIG. 15 is a view showing a change in a focus evaluation value for a position of a focus lens in fully MF in the digital camera.

Next, in step S2605, the image processing controller 213 calculates the focus evaluation value in a focus detection area 217D (hereinafter referred to as setting area) to represent the focus evaluation value as MF now. FIG. 15 shows the change in the focus evaluation value for the position of the focus lens of the photographing optical system 102. For instance, the focus evaluation values MF v for the focus lens positions L1, L2, . . . , and L5 are respectively MF start, MF1, . . . , and MF peak. A first lens movement R1 represents the change in the focus evaluation value MF v when the focus lens is moved in order of L1, L2, and L5. A second lens movement R2 represents the change in the focus evaluation value MF v when the focus lens is moved in order of L5, L4, . . . , and L1

Next, the body microcomputer 201 determines whether a display scale in the focus meter 217B has been already determined in step S2606.

The display scale of the focus meter 2717B shown in FIG. 14, for example, is not determined immediately after starting MF. Thereby, the body microcomputer 201 transfers to step S2607 to determine a maximum value and a minimum value of the focus meter 217B on the basis of the value: MF v now, which is the latest focus evaluation value obtained in step S2605. The focus meter 217B has the extensible display bar 217B1. The display bar 217B1 has maximum and minimum values when the display bar 217B1 is lengthened and shortened.

With regard to the maximum and minimum values of the focus meter 217B, by way of example, a value in which the display bar 217B1 is fully lengthened is set to MF now×50 as the maximum value of the focus meter 217B. As the minimum value of the display bar 217B1, a value in which the display bar 217B1 is not displayed is set to "0". In accordance with such a setting, the display of the focus meter 217B can be automatically scaled. For example, a user selects menu items, displayed by operating the menu button 222I, whereby the maximum and minimum values of the focus meter 217B may be determined.

Once the body microcomputer 201 determines the maximum and minimum values of the focus meter 217B, the body microcomputer 201 does not perform step S2607. The body microcomputer 201 finishes the still image taking in step S46. When the MF mode is again started in step S18, the body microcomputer 201 initializes the focus meter 217B in step S20 to proceed from step S2606 to step S2607.

Next, in step S2608 the body microcomputer 201 displays the present focus evaluation value: MF v now, as the display bar 217B1 in the focus meter 217B in accordance with the display scale determined in step S2607.

Next, in step S2609 the body microcomputer 201 determines whether the value of the flag representing that the focus evaluation value MF v has changed beyond the peak value: "flag_peak" is "0". When the focus evaluation value MF v changed beyonds the peak value during the processing of MF, "flag_peak" is set to "1". Thereby, whether the value of the flag: "flag_peak" is "0" is determined by the determination whether the focus evaluation value has changed beyond the peak value.

When the body microcomputer 201 transfers to step S2609 for the first time, the value of the flag: "flag_peak" is set to "0". Thereby, the body microcomputer 201 transfers from step S2609 to step S2610.

Figure 18:
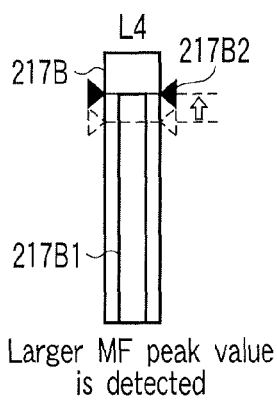
FIG. 18 is a view showing the change of the focus meter when a large-peak focus evaluation value is detected in the digital camera.

Next, in step S2610 the body microcomputer 201 determines whether the present focus evaluation value MF v now is the peak value. When it is determined that MF v now is the peak value, the body microcomputer 201 transfers to step S2611 to assign the value of the present focus evaluation value MF v now to the focus evaluation value MF peak representing the peak value shown in FIG. 15 for example, and thus to update the value of the focus evaluation value MF v peak, and, at the same time, updates the display position of the peak hold mark 217B2 shown in FIG. 16. Incidentally, FIG. 16 shows the change of the focus meter 217B in the first lens movement R1 of the focus lens, while FIG. 17 shows the change of the focus meter 217B in the second lens movement R2 of the focus lens. Further, FIG. 18 shows the change of the focus meter 217B when the focus evaluation value having a large peak value is detected.

Next, in step S2612 the body microcomputer 201 determines whether the following condition (1) is satisfied:

$$MF\text{vpeak} - MF\text{vnow} > \text{first predetermined value } K1 \quad (1)$$

Figure 19:
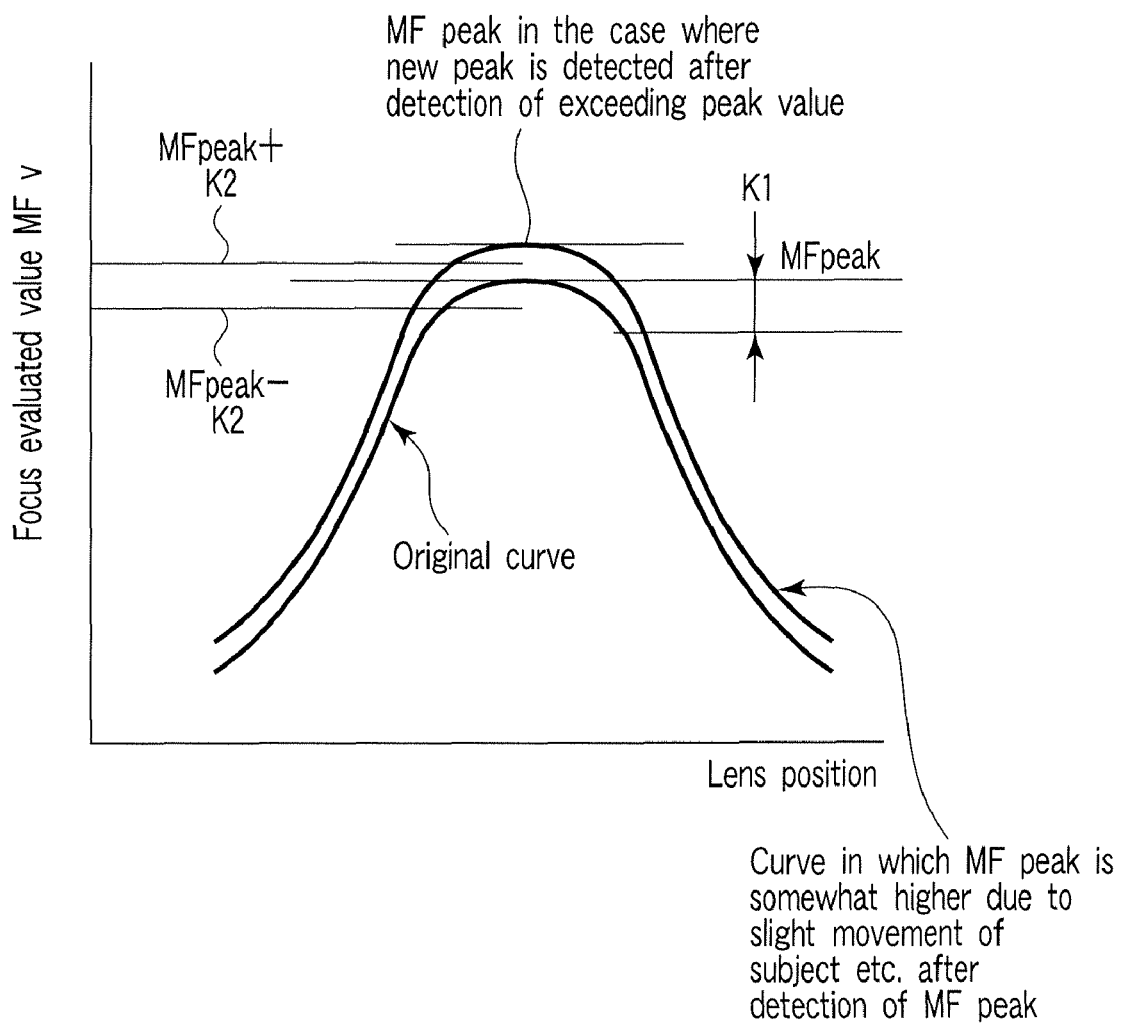
FIG. 19 is a view showing an outline of the focus evaluation value when a new peak is detected after it is determined that the focus evaluation value has changed beyond the peak value in the digital camera.

In the condition (1), the first predetermined value K1 of the right side represents a threshold value for determining whether the focus evaluation value MF v now is lower by a predetermined value than the focus evaluation value MF v peak, as shown in FIG. 19. Namely, when the condition (1) is satisfied, the focus ring 106 is rotated by a user, whereby the focus evaluation value temporarily changed beyond the peak value. Also thereafter, the rotating operation of the focus ring 106 in the same direction is continued, which means that the present focus evaluation value MF v now is lowered so as to allow the peak value to be determined after the present focus evaluation value MF v now has changed beyond the peak value.

When it is determined that the condition (1) is not satisfied, the body microcomputer 201 returns to the main flowchart shown in FIG. 4.

Meanwhile, when the condition (1) is satisfied, the body microcomputer 201 transfers to step S2613 to determine that the focus evaluation value MF v has temporarily changed beyond the peak value, and thus to set the flag representing that the focus evaluation value MF v has changed beyond the peak value: "flag_peak" to "1".

As described above, when "1" is set in the flag: "flag_peak" by the determination in which the focus evaluation value MF v has temporarily changed beyond the peak value, the body microcomputer 201 again determines that the flag: "flag_peak" is not "0" in step S2609 to transfer to step S2614.

Next, the case in which "1" is set in the flag: "flag_peak" by the determination in which the focus evaluation value MF v has temporarily changed beyond the peak value will be described.

When the body microcomputer 201 determines that the focus evaluation value MF v obtained by the image processing controller 213 has temporarily changed beyond the peak value whereby "1" is set in the flag: "flag_peak" in step S2609, the body microcomputer 201 transfers to step S2614.

In step S2614, the body microcomputer 201 determines whether the following condition (2) is satisfied:

$$|MF\text{vpeak} - MF\text{vnow}| < \text{second predetermined value } K2 \quad (2)$$

The second predetermined value K2 of the right side of the condition (2) is a threshold value set in consideration of a possibility of a change of the focus evaluation value MF peak as the peak value after the focus evaluation value MF v has temporarily changed beyond the peak value. The second predetermined value K2 is necessary for appropriately determining the state of the peak value of the focus evaluation value MF v, and is a value for producing a dead band region in the peak value of the focus evaluation value MF v.

As long as the condition (2) is satisfied, the body microcomputer 201 determines that the present focus evaluation value MF now is in the peak state. Incidentally, as shown in FIG. 19, the second predetermined value K2 is smaller than the first predetermined value K1 in the condition (1).

When it is determined that the condition (2) is satisfied, namely, when the present focus evaluation value MF now again coincides with the focus evaluation value MF v as the peak value, the body microcomputer 201 transfers from step S2614 to step S2615 to change the display format of the display bar 217B1. Namely, as shown in FIG. 17 for example, the body microcomputer 201 changes the display format of the display bar 217B1 of the peak focus evaluation value MF peak, for example, changes the color of the display bar 217B1 from white to black. In the process in the second lens movement R2 of the focus lens, when the focus lens is located at the lens position L4, the color of the display bar 217B1 is changed from white to black, whereby the focusing state is notified to a user.

Next, the body microcomputer 201 returns to the main flowchart shown in FIG. 4. At that time, the user determines that the focusing is completed to fully press the release switch, and thus to be able to make the digital camera 300 perform the still image taking (step S24).

Meanwhile, when it is determined that the condition (2) is not satisfied, namely, when the present focus evaluation value MF now again does not coincide with the focus evaluation value MF v as the peak value, the body microcomputer 201 transfers from step S2614 to step S2616 to determine whether the following condition (3) is satisfied:

$$MF\text{now} > MF\text{peak} + \text{second predetermined value } K2 \quad (3)$$

When it is determined that the condition (3) is not satisfied, the body microcomputer 201 transfers to step S2619 to return the display format of the display bar 217B1 to the original display format. Namely, when the display format of the display bar 217B1 is changed in order to inform the focusing to the user, the body microcomputer 201 returns the display bar 217B1 to the normal display format. Meanwhile, when the display format of the display bar 217B1 is the normal display format, the body microcomputer 201 keeps the normal display format, whereby the body microcomputer 201 informs the user that the digital camera 300 is not in the focusing state.

Thereafter, the body microcomputer 201 returns to the main flowchart shown in FIG. 4.

The condition (3) is satisfied when the larger peak focus evaluation value MF v peak is obtained after the display format of the display bar 217B1 has been changed in step S2615. In this case, as shown in FIG. 16 for example, in step S2617 the body microcomputer 201 displays the peak hold mark 217B2 at a position corresponding to the present focus evaluation value MF now to update the peak focus evaluation value MF v peak.

Next, in step S2618 the body microcomputer 201 initializes the value of the flag representing that the focus evaluation value MF has changed beyond the peak value: "flag_peak" to "0". The body microcomputer 201 then transfers to step S2619. In accordance with the processing result in step S2617, in the next step S2609 the body microcomputer 201 determines the value of the flag representing that the focus evaluation value MF has changed beyond the peak value: "flag_peak" as "0".

Figure 9:
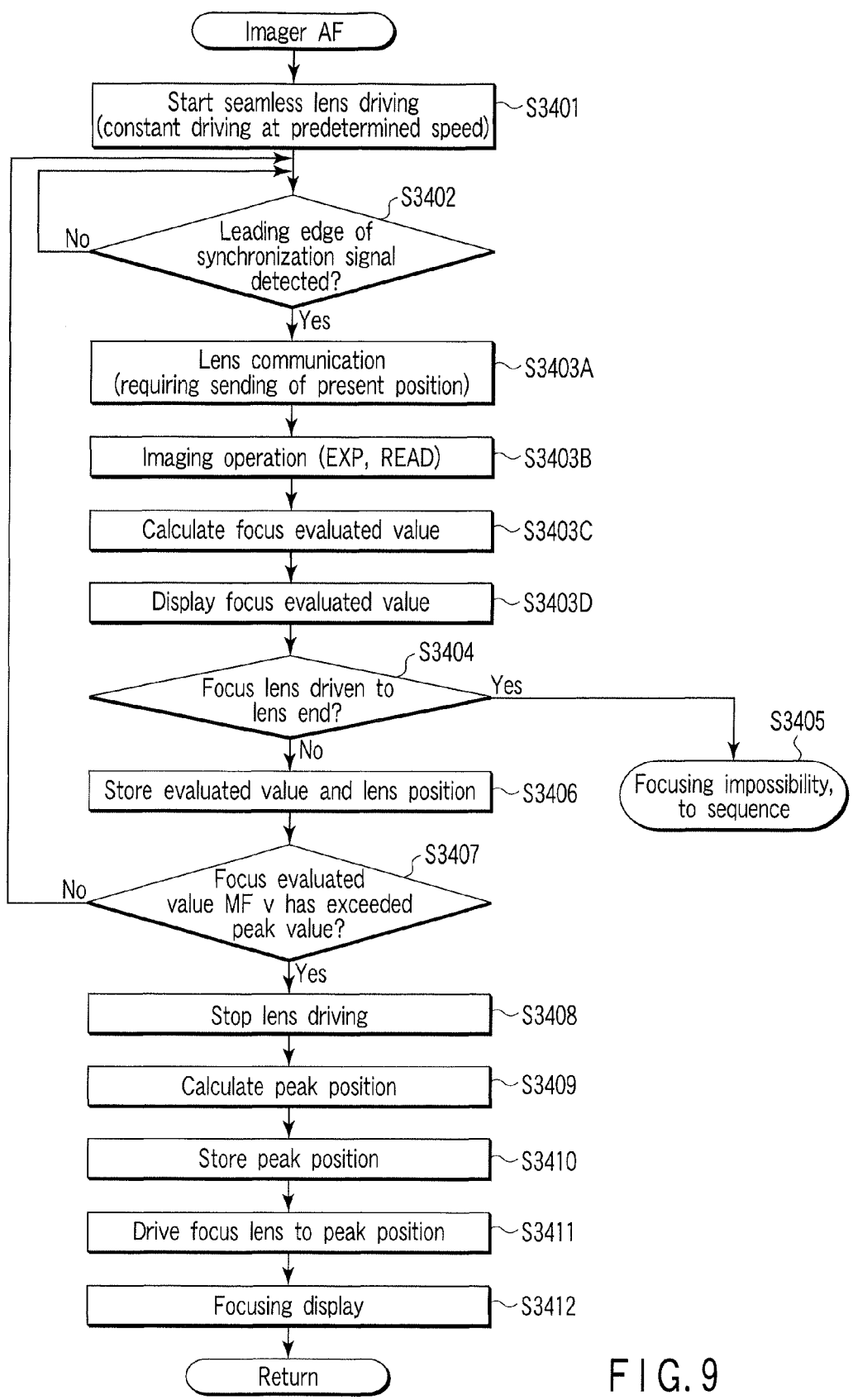
FIG. 9 is a processing flowchart of imager AF in the digital camera.

Next, imager AF (step S34) will be described in accordance with the flowchart of imager AF shown in FIG. 9.

When imager AF is started, in step S3401 the body microcomputer 201 starts the movement of the focus lens of the photographing optical system 102 as shown in a timing chart of imager AF shown in FIG. 20 to send a lens drive command to the lens microcomputer 101. The lens microcomputer 101 receives a seamless drive start command to drive the lens drive mechanism 103, and thus to drive the focus lens at a predetermined speed. Thereby, the focus lens is moved at a constant speed. In this case, the body microcomputer 201 continuously drives the lens drive mechanism 103 without stopping the movement of the focus lens until the focus evaluation value MF v changed beyond the peak value. The movement of the focus lens at that time is referred to as seamless driving.

The driving direction of the seamless driving is opposite to the moving direction of the focus lens in manual focusing immediately before the seamless driving. The body microcomputer 201 moves the focus lens to calculate the focus evaluation value MF v. At this time, when the focus evaluation value MF v is decreased, the body microcomputer 201 stops the movement of the focus lens to reverse the moving direction of the focus lens. Note that the reverse of the moving direction of the focus lens is omitted in FIGS. 8, 21, and 25.

In step S3402, the imaging element 211 waits for the input of the synchronization signal generated by the image processing controller 213. The imaging element 211 detects the leading edge of the synchronization signal generated by the image processing controller 213 to start the imaging operation in step S3403B.

In addition, when the imaging element 211 detects the leading edge of the synchronization signal generated by the image processing controller 213, in step S3403A the body microcomputer 201 sends a command for requiring information about the present position of the focus lens to the lens microcomputer 101 at a substantially intermediate timing of an exposure period (EXP). The lens microcomputer 101 receives the command from the body microcomputer 201 to send the information about the present position of the focus lens to the body microcomputer 201. The position of the focus lens is changed to a certain degree in the exposure period (EXP). Thus, since the intermediate timing of the exposure period is optimum as a representative point of the position of the focus lens during exposure, the position of the focus lens is obtained at a substantially intermediate timing of the exposure period.

In the imaging operation by the imaging element 211, the exposure (EXP) of the imaging element 211 is performed. When the exposure is finished, the image processing controller 213 reads (READ) the image data obtained by the imaging element 211. The body microcomputer 201 receives the image data from the image processing controller 213 to display the image data on the liquid crystal monitor 217.

Next, in step S3403C the image processing controller 213 calculates the focus evaluation value MF v in parallel to the reading of the image data obtained by the imaging element 211.

Next, in step S3403D the body microcomputer 201 displays the focus evaluation value MF v, obtained by the image processing controller 213, in the focus meter 217B. The focus meter 217B is displayed also in imager AF operation.

Next, in step S3404 the lens microcomputer 101 determines whether the focus lens is moved to the lens end. Namely, when the focus lens is moved in a close-range direction at the present moment, the lens microcomputer 101 determines whether the focus lens is moved to a close-range end. Additionally, when the focus lens is moved in an infinite direction at the present moment, the lens microcomputer 101 determines whether the focus lens is moved to an infinity end.

When it is determined that the focus lens has been moved to an end part in the movable range, in step S3405 the lens microcomputer 101 sends the information, indicating that the focus lens has been moved to the end part in the movable range, to the body microcomputer 201 to perform a processing of the focusing impossibility. Namely, the body microcomputer 201 sends a lens drive stopping command to the lens microcomputer 101 to stop the movement of the focus lens, and at the same time, to display the focusing impossibility on the liquid crystal monitor 217. The body microcomputer 201 then transfers to a processing for the next taking.

Meanwhile, when the focus lens is not moved to the end of the movable range, the body microcomputer 201 transfers from step S3404 to step S3406 to store the focus evaluation value MF v obtained by the image processing controller 213 and the present position information of the focus lens from the lens microcomputer 101 in the buffer memory 214. Thereby, a pair of the focus lens position and the focus evaluation value MF v, shown in FIG. 21 for example, can be obtained for every imaging operation by the imaging element 211. For example, the pair of the focus lens position and the focus evaluation value MF v corresponds to black circles shown in FIG. 21.

Next, in step S3407 the body microcomputer 201 determines whether the focus evaluation value MF v has changed beyond the peak value on the basis of the pair of the information of the focus lens position and the focus evaluation value MF v stored in the buffer memory 214. When it is determined that the focus evaluation value does not changed beyond the peak value, the body microcomputer 201 returns to step S3402 to repeat the steps from S3401 to S3407.

Meanwhile, when the focus evaluation value MF v has changed beyond the peak value, in step S3408 the body microcomputer 201 sends the drive stopping command for the focus lens to the lens microcomputer 101 to stop the movement of the focus lens.

Figure 21:
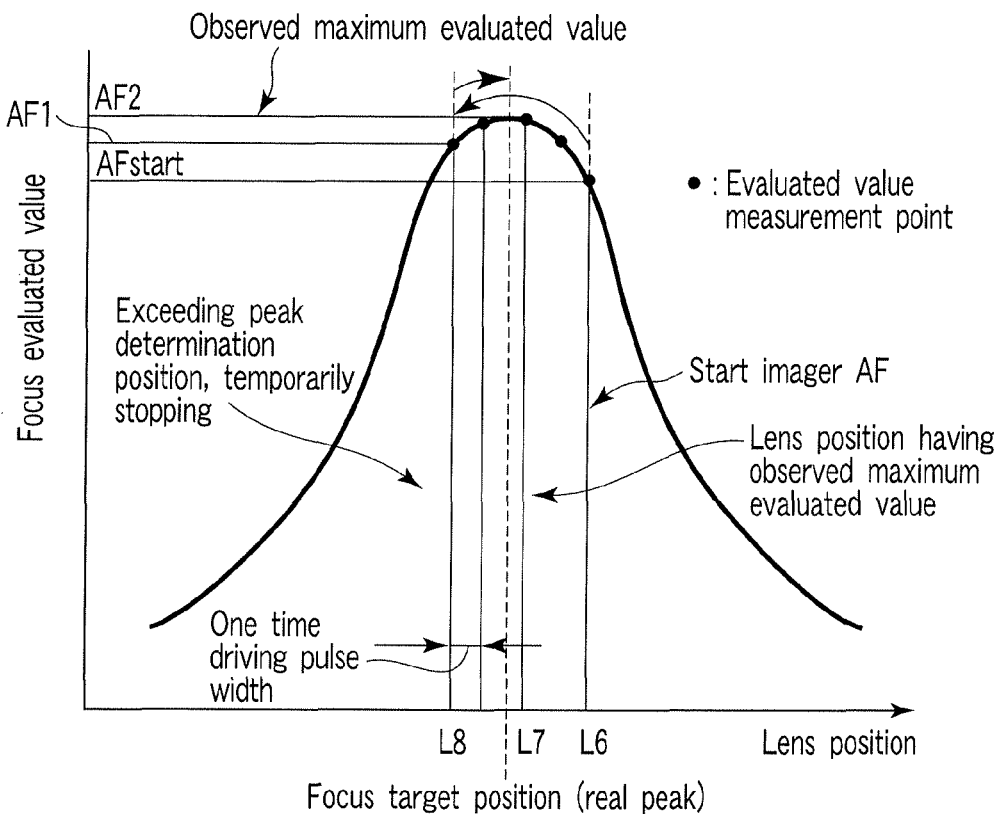
FIG. 21 is a view schematically showing only focusing operation by imager AF in the digital camera.

Next, in step S3409 the body microcomputer 201 detects a position where the focus evaluation value MF v stored in the buffer memory 214 is the peak value, for example the lens position L7 shown in FIG. 21. For example, the body microcomputer 201 then performs interpolation calculation by using each pair of the lens positions before and after the lens position L7 and the corresponding focus evaluation value MF v to obtain the real peak position of the focus evaluation value MF v, and thus to obtain the lens position corresponding to the obtained peak position as a focus target position.

Next, in step S3410 the body microcomputer 201 stores the focus target position in the buffer memory 214.

Next, in step S3411 the body microcomputer 201 sends a command for moving the focus lens to the focus target position and then stopping the focus lens, to the lens microcomputer 101. Thereby, the lens microcomputer 101 drives the lens drive mechanism 103 to move the focus lens to the focus target position, and thus to stop the focus lens.

Next, in step S3412 the body microcomputer 201 performs the focusing display on the liquid crystal monitor 217. Thereby, the focusing operation by imager AF is finished.

After the focusing has been completed, when the release switch is fully pressed by a user, the body microcomputer 201 finishes the live view mode to take a still image.

Figure 10:
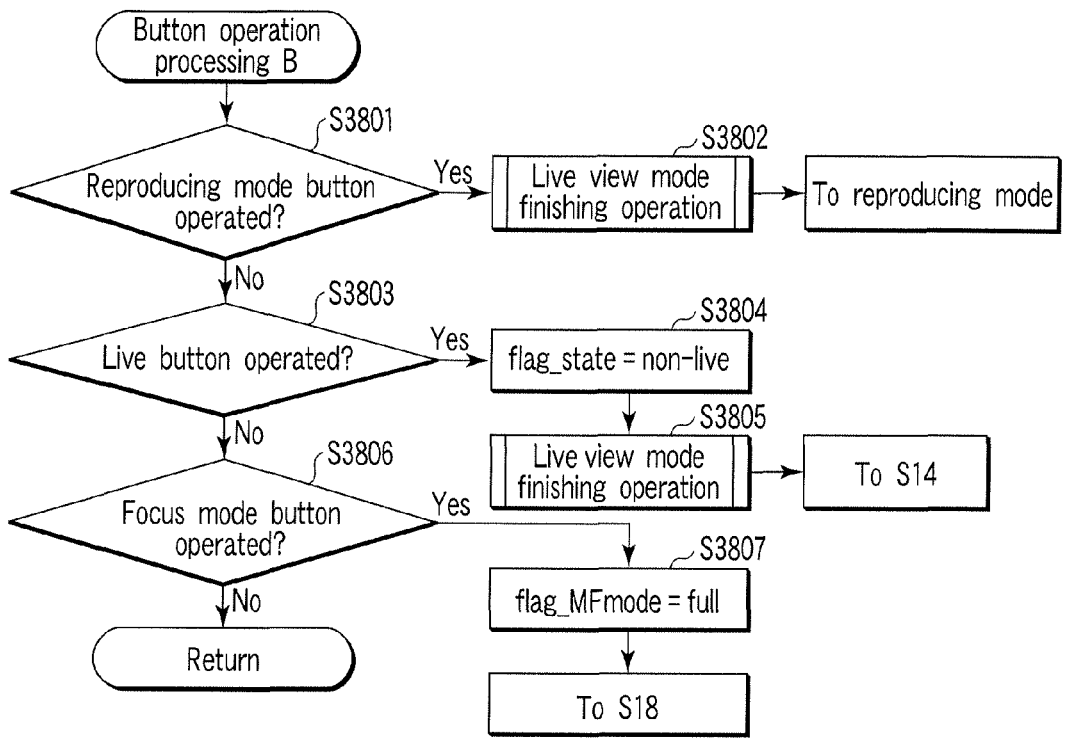
FIG. 10 is a flowchart of a button operation processing B in the digital camera.

Next, the button operation processing B (step S38) will be described in accordance with the flowchart of the button operation processing B shown in FIG. 10.

First, in step S3801, the body microcomputer 201 determines whether the reproducing button 222E has been operated. When it is determined that the reproducing button 222E has been operated, the body microcomputer 201 transfers to step S3802 to perform the finishing operation of the live view mode before transition to the reproducing mode. The finishing operation of the live view mode is the same as that in step S44. In the reproducing mode, since the lens control section 4 does not need to be controlled, the control by the MF control section 3C may be released. After finishing of the finishing operation of the live view mode, the transition to the reproducing mode is performed.

Meanwhile, when the reproducing button 222E is not operated, the body microcomputer 201 transfers to step S3803 to determine whether the live button 222L has been operated. When it is determined that the live button 222L has been operated, the body microcomputer 201 transfers to step S3804 to set the flag for the non-live view mode: "flag_state"="non-live".

Next, in step S3805 the body microcomputer 201 performs the finishing operation of the live view mode. The processing in step S3805 is the same as that in step S44.

Thereafter, the body microcomputer 201 transfers to step S14.

When the live button 222L is not operated, the body microcomputer 201 transfers from step S3803 to step S3806 to determine whether the focus mode button 222M has been operated. When it is determined that the focus mode button 222M has been operated, the body microcomputer 201 transfers to step S2207 to switch the flag for determining whether the MF mode is the fully MF or the partial MF: flag_MF mode. Namely, when the flag_Mf mode is "semi" representing the partial MF at the present moment, the body microcomputer 201 switches the flag: flag_MF mode to "full" representing the fully MF. Meanwhile, when the flag: flag_Mf mode is "full" at the present moment, the body microcomputer 201 switches the flag: flag_MF mode to "semi".

When the focus mode button 222M is not operated, the body microcomputer 201 returns to the main flowchart shown in FIG. 4.

Figures 11, 12:
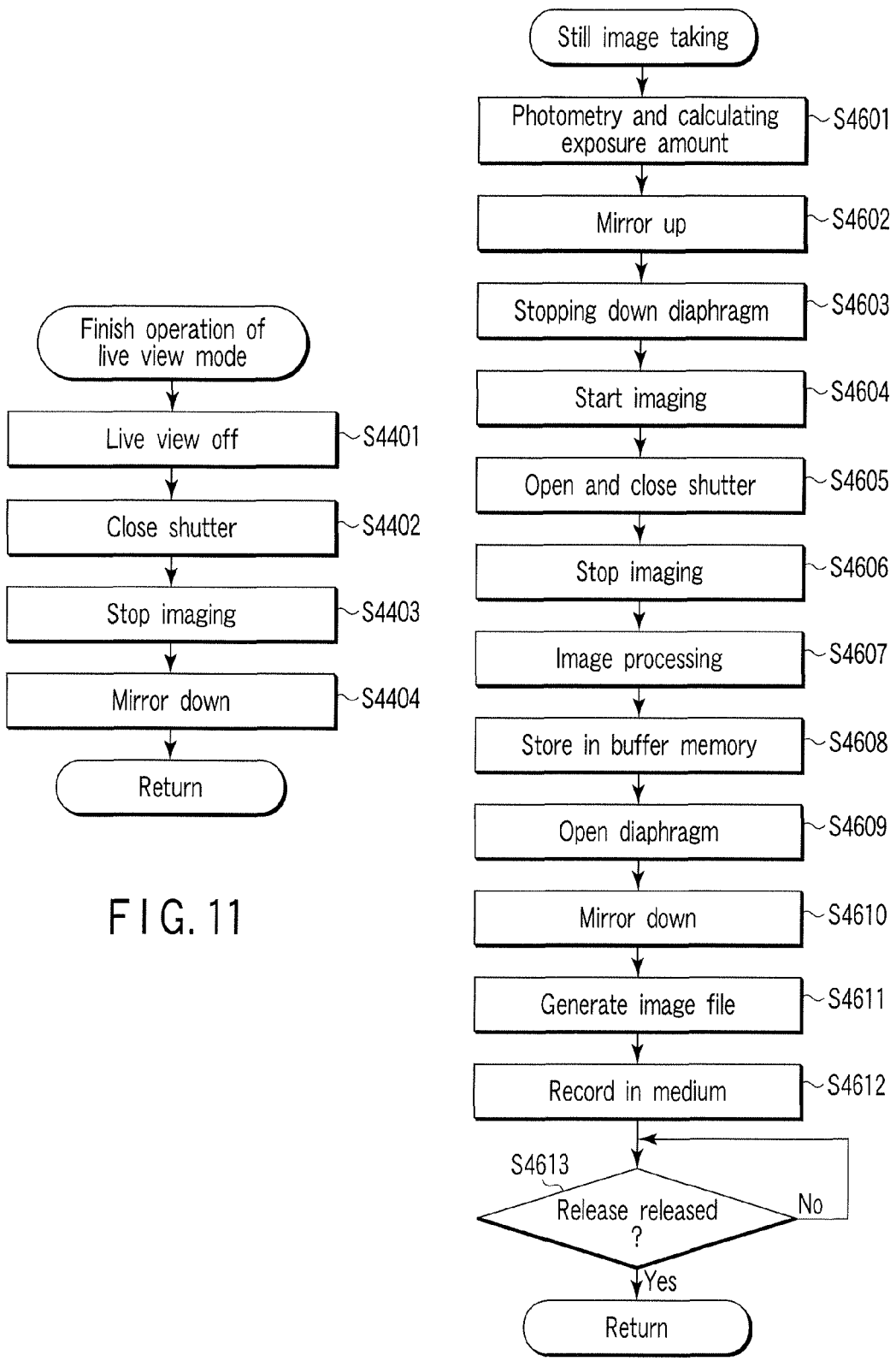
FIG. 11 is a finish processing flowchart of the live view mode in the digital camera.
FIG. 12 is a flowchart of still image taking in the digital camera.

Next, the finishing operation of the live view mode (step S44) will be described in accordance with the flowchart of the finishing operation of the live view mode shown in FIG. 11.

First, in step S4401 the body microcomputer 201 finishes displaying of the live view in the liquid crystal monitor 217.

Next, in step S4402 the body microcomputer 201 closes the opened shutter section 208. Thereafter, the body microcomputer 201 stops the imaging operation by the imaging element 211 in step S4403. The body microcomputer 201 then lowers the mirror 202a to the down position in step S4404.

Next, the still image taking operation (step S46) will be described in accordance with the flowchart of the still image taking operation shown in FIG. 12.

When the still image taking is started in MF, which is the fully MF or the partial MF, the main mirror 202a is lowered to the down position. When the still image taking is started in the phase difference AF, the main mirror 202a has been already lowered to the down position. Therefore, the still image taking operation is started in such a state that the main mirror 202a is located at the down position.

The photometric circuit 204 first receives a portion of light flux having passed through the pentaprism 202b onto a photosensor. The photometric circuit 204 performs a well-known photometric processing on the basis of the light amount detected by the photosensor. The photometric circuit 204 sends the result of the photometric processing to the body microcomputer 201.

In step S4601, the body microcomputer 201 receives the photometric processing result from the photometric circuit 204 to calculate an opening time of the shutter section 208 and a diaphragm value of the diaphragm 104 on the basis of the photometric processing result.

Next, in step S4602 the body microcomputer 201 sends an instruction, for moving the main mirror 202a to the up position only during the opening time of the shutter section 208, to the mirror drive mechanism 207. Thereby, the main mirror 202a is moved to the up position.

Next, in step S4603 the body microcomputer 201 sends an instruction, for releasing the diaphragm 104 only during the opening time of the shutter section 208 on the basis of the diaphragm value, to the diaphragm drive mechanism 105. Thereby, the diaphragm 104 is released only during the opening time of the shutter section 208 on the basis of the diaphragm value.

Next, in step S4604, the imaging element 211 starts the imaging operation.

Next, in step S4605 the body microcomputer 201 closes the shutter section 208 after the opening time of the shutter section 208 has elapsed. Thereafter, the imaging sensor 211 stops the imaging operation in step S4606. The image processing controller 213 then reads the image data from the imaging element 211 through the interface circuit 212.

Next, in step S4607, the image processing controller 213 applies the image processing to the image data read from the imaging element 211. In step S4608, the body microcomputer 201 then temporarily stores the image data, having been subjected to the image processing by the image processing controller 213, in the buffer memory 214. Further, in step S4609 the body microcomputer 201 returns the diaphragm 104 to the release position. In step S4610, the body microcomputer 210 lowers the main mirror 202a to the down position as the initial state.

Next, in step S4611 the image processing controller 213 converts the image data temporarily stored in the buffer memory 214 to a format writable into the recording medium 216, and thus generates an image file of the image data.

Finally, in step S4612 the body microcomputer 201 records the generated image file of the image data into the recording medium 216. In step S4613, when the release is released, the body microcomputer 201 completes the still image taking.

Figure 13:
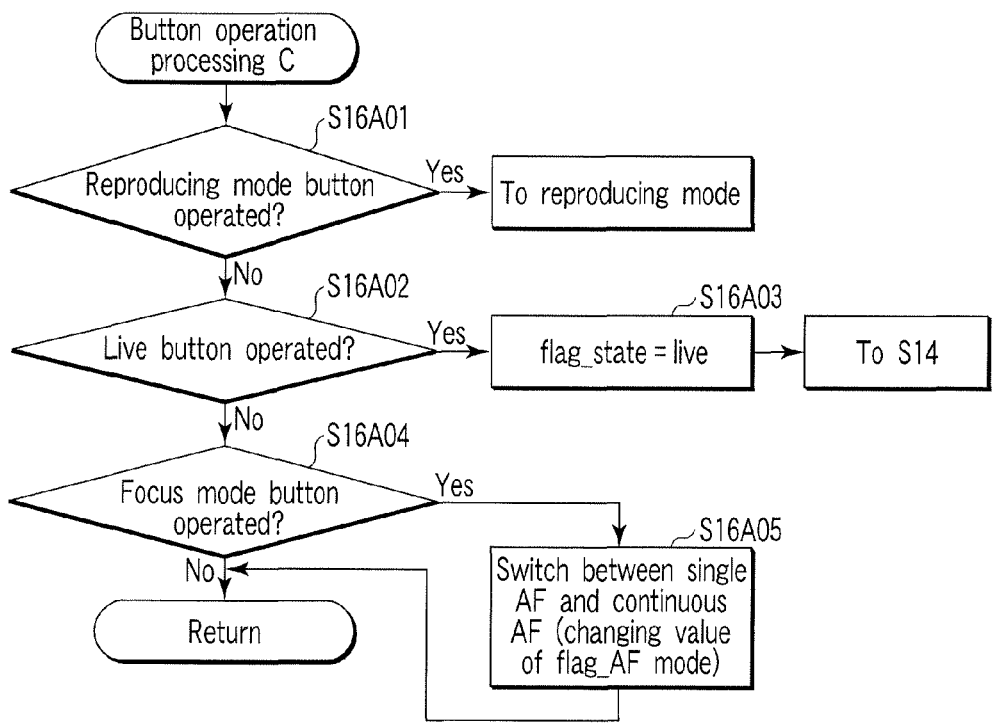
FIG. 13 is a flowchart of button operation processing C in the digital camera.

Next, the button operation processing C (steps S16A and S24A) will be described in accordance with the flowchart of the button operation processing C shown in FIG. 13.

First, in step S16A01, the body microcomputer 201 determines whether the reproducing button 222E has been operated. When it is determined that the reproducing button 222E has been operated, the body microcomputer 201 transits to the reproducing mode. In the reproducing mode, since the lens control section 4 does not need to be controlled, the control by the MF control section 3C may be released.

Meanwhile, when the reproducing button 222E is not operated, the body microcomputer 201 transfers to step S16A02 to determine whether the live button 222L has been operated. When it is determined that the live button 222L has been operated, the body microcomputer 201 transfers to step S16A03 to set the flag in the live view mode: "flag_state"="live". Thereafter, the body microcomputer 201 proceeds to step S14.

When the live button 222L is not operated, the body microcomputer 201 transfers from step S16A02 to step S16A04 to determine whether the focus mode button 222M has been operated. When it is determined that the focus mode button 222M has been operated, the body microcomputer 201 transfers to step S16A05 to switch the AF mode between single AF and continuous AF. Namely, the phase difference AF mode has a flag: flag_AF mode. The flag_AF mode takes the values "continuous" and "single". If the flag_AF mode is "continuous", the phase difference AF mode is continuous AF. If the flag_AF mode is "single", the phase difference AF mode is single AF. Thus, when the flag: flag_AF mode is "continuous" representing continuous AF at the present moment, the body microcomputer 201 switches the flag: flag_AF mode to "single" representing single AF. Meanwhile, when the flag: flag_AF mode is "single" representing single AF at the present moment, the body microcomputer 201 switches the flag: flag_AF mode to "continuous" representing continuous AF.

If the focus mode button 222M is not operated, the body microcomputer 201 returns to the main flowchart shown in FIG. 4.

Figure 22:
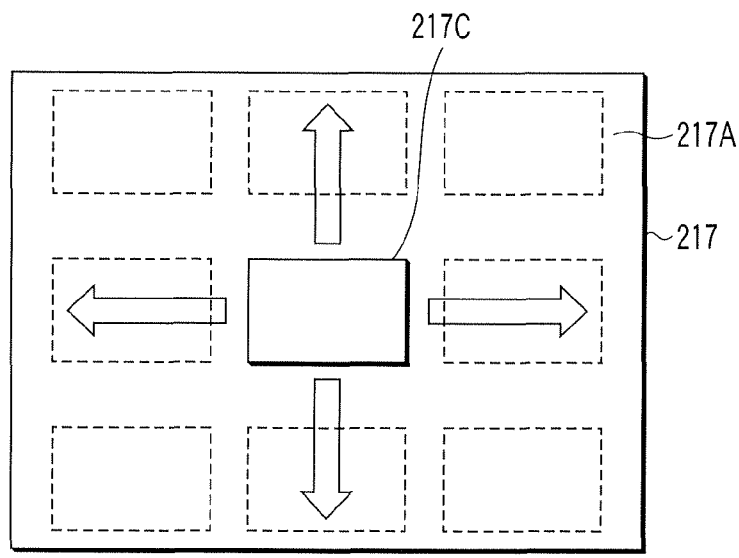
FIG. 22 is a view showing an example of displaying an enlargement box in an image display region of a liquid crystal monitor in the digital camera.
Figure 23:
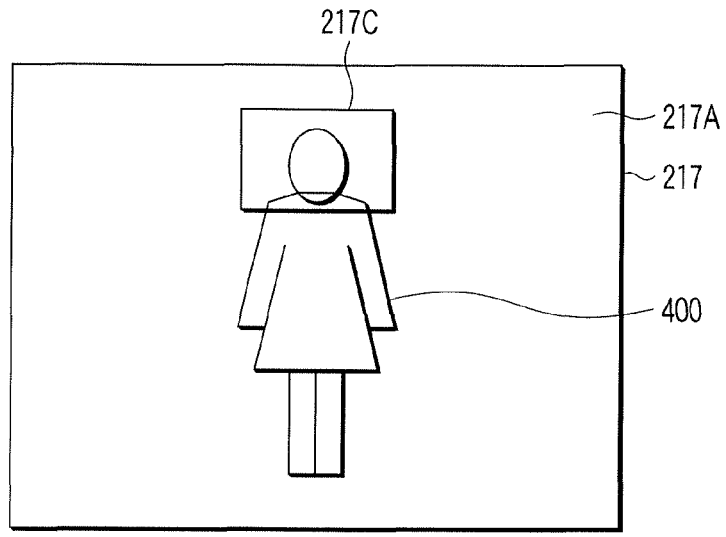
FIG. 23 is a view showing an example in which the enlargement box is matched to a region including a head section of a subject in the digital camera.

FIGS. 22 and 23 show an example for specifying an enlarged region used for the focusing operation by a photographer. FIG. 22 shows an example of displaying an enlargement box 217C in an image display region 217A of the liquid crystal monitor 217. A subject 400 is not displayed therein. The enlargement box 217C can be moved to a position intended by a user in the image display region 217A of the liquid crystal monitor 217.

Thus, the user moves the enlargement box 217C so as to superimpose the enlargement box 217C onto a region including an image part which the user wants to display in enlargement. For example, the user operates the arrow button 222J whereby the enlargement box 217C can be moved. After the enlargement box 217C is moved to the position intended by the user, when the OK button 222K is pressed by the user, the body microcomputer 201 determines the enlarged region to display the image part in the enlargement box 217C in the entire image display region 217A.

FIG. 23 shows an example in which the enlargement box 217C is matched to a region including a head part of the subject 400. In such a state, when the user presses the OK button 222K, the body microcomputer 201 determines the head part of the subject 400 as the region to be enlarged. The enlargement box 217C is then enlarged and displayed in the entire image display region 217A as shown in FIG. 14.

The length of the display bar 217B1 in the focus meter 217B shown in FIG. 14 corresponds to the focus evaluation value MF v calculated from the image in the focus detection area 217D. The focus detection area 217D is used for calculating the focus evaluation value MF v for detecting the focus position. The display bar 217B1 in the focus meter 217B is displayed when the focusing operation is performed by MF (full MF or partial MF) in the live view mode.

Figure 24:
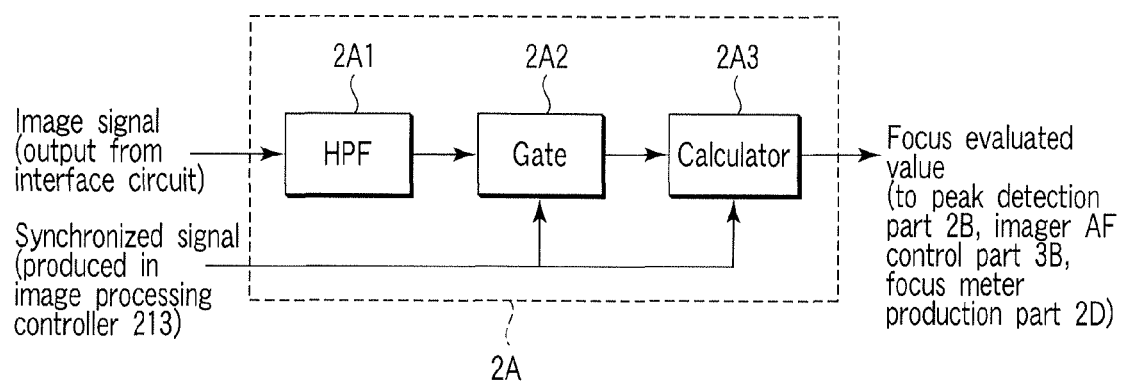
FIG. 24 is a view showing a flow of a signal for calculating the focus evaluation value in an image processing controller in the live view mode in the digital camera.

FIG. 24 shows a flow of a signal for calculating the focus evaluation value in the image processing controller 213 in the live view mode. The focus evaluation value MF v calculated by the image processing controller 213 is displayed as the display bar 217B1 in the focus meter 217B on the liquid crystal monitor 217 in MF operation and AF operation (imager AF operation) in the live view mode. Namely, the focus meter 217B and the display bar 217B1 displayed in the focus meter 217B represent graphically the focus evaluation value MF v.

The focus evaluation value is calculated by the focus evaluation value calculation section 2A in the image processing controller 213. The focus evaluation value calculation section 2A inputs the image data, output from the interface circuit 212, into a high-pass filter (HPF) 2A1, and, at the same time, inputs the synchronization signal into a focus detection area selection gate 2A2 and a calculator 2A3.

The HPF 2A1 extracts a high-frequency component contained in the image signal. As the sharpness of the image data is higher (as focusing is further increased), the image signal contains more high-frequency components. The high-frequency component is integrated whereby the level of the sharpness of an average image within an integration range can be digitized.

The high-frequency component having passed through the HPF 2A1 is input into the focus detection area selection gate 2A2. The focus detection area selection gate 2A2 extracts only the image data corresponding to the focus detection area on an imaging screen. Further, the focus detection area selection gate 2A2 extracts only the high-frequency component of the image in the focus detection area. A digital signal extracted by the focus detection area selection gate 2A2 is input into the calculator 2A3, and thus the high-frequency component of the image in the focus detection area is integrated by every frame. The integrated value as the focus evaluation value in the photographing optical system 102 is sent to the peak detection section 2B, the focus meter production section 2D, and the imager AF control section 3B.

Figure 25:
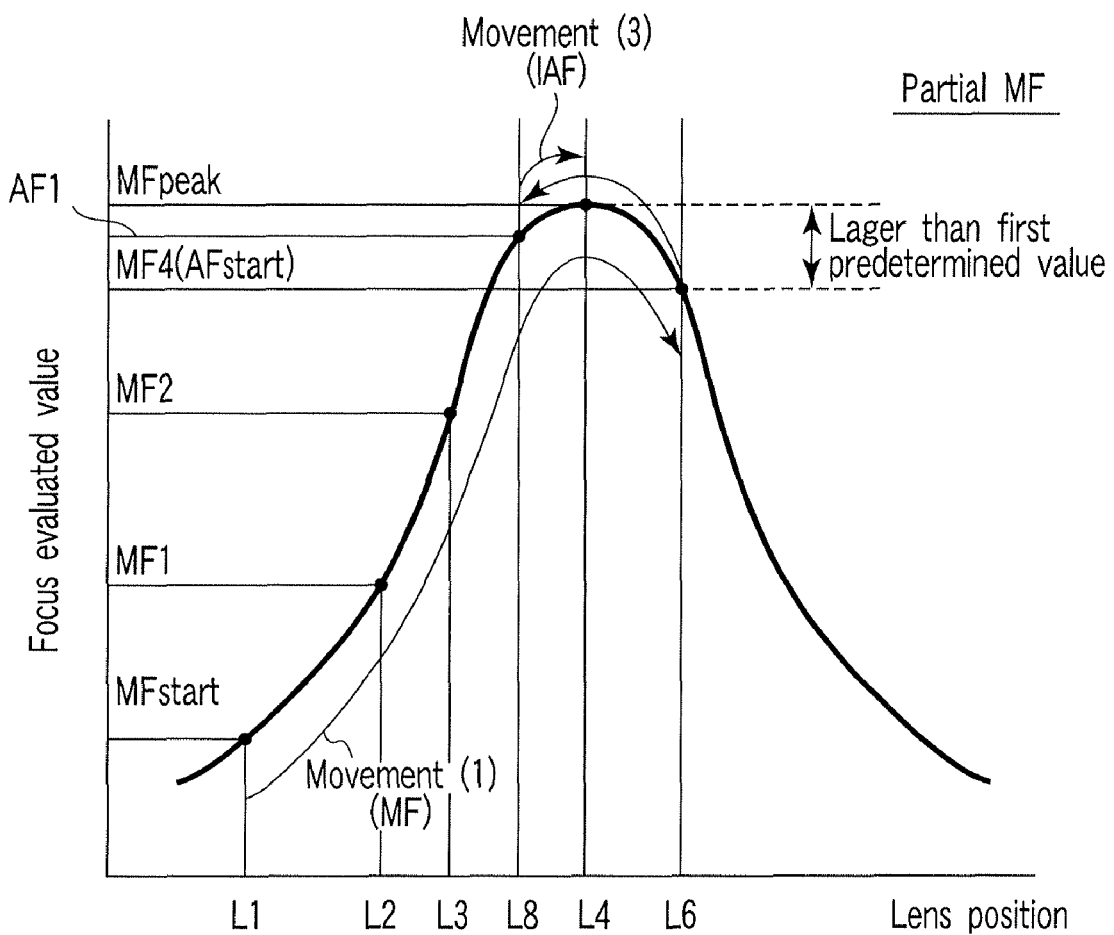
FIG. 25 is a view showing an outline of a process in which the focus lens is moved to a focusing position by imager AF subsequent to MF in the digital camera.

FIG. 25 shows a relation between the focus evaluation value MF v in the fully MF operation and the position of the focus lens of the photographing optical system 102. The focus evaluation value at the time when the MF mode is started (step S18) is represented as MF start. The focus lens of the photographing optical system 102 at that time is located at the lens position L1. The focus evaluation value MF v start at the lens position L1 is substantially low. Namely, when the focus lens is located at the lens position L1, focusing is substantially deviated.

FIG. 25 shows the focus evaluation values MF v, that is, the focus evaluation values MF1, MF2, MF peak, MF 4, and the like respectively corresponding to the lens positions L2, L3, L4, L6, and the like, in addition to the lens position L1. The focus evaluation value MF peak represents the focus evaluation value at the peak. The focus evaluation value MF v is repeatedly calculated at a predetermined frame rate from the time when the MF mode is started.

The focus evaluation value MF v in the image in the focus detection area 217D shown in FIG. 14 is calculated. For example, the focus detection area 217D occupies 50% of the entire display screen in the up, down, left and right directions from the center of the image display region 217A of the liquid crystal monitor 217. For example, the user selects the menu items displayed by operating the menu button 222I, whereby the size of the focus detection area 217D can be changed.

FIGS. 16 to 18 show only the focus meter 217B taken from the image display region 217A. The focus meter 217B is synthesized to (superimposed onto) the through image to be displayed in the image display region 217A of the liquid crystal monitor 217 in the MF mode. Incidentally, display means, which displays only an indicator of the focus evaluation value MF v corresponding to the focus meter 217B, may be provided in addition to the liquid crystal monitor 217.

As shown in FIG. 14, the focus meter 217B is displayed on a right end of the image display region 217A. For example, the user selects the menu item displayed by operating the menu button 222I, whereby the display position of the focus meter 217B can be changed or can be in a non-display state. Additionally, in order to easily read the focus meter 217B, it is possible to prevent the through image in a background part of the focus meter 217B from being displayed.

The focus evaluation value MF v calculated in the focus detection area 217D is displayed as the length of the display bar 217B1 in the focus meter 217B as shown in FIGS. 14 and 16 to 18, for example. As the display bar 217B1 is longer, the focus evaluation value MF v is higher. The high focus evaluation value represents the high focus level. Meanwhile, as the display bar 217B1 is shorter, the focus evaluation value MF v is lower. The low focus evaluation value represents the low focus level.

Further, as shown in FIGS. 16 to 18, the focus evaluation value MF v for each lens position of the focus lens is displayed as it is as the display bar 217B1. At the same time with the display bar 217B1, the peak hold mark 217B2 is displayed for specifying the peak value of the focus evaluation value MF v to the user.

Hereinafter, a procedure of the focusing operation in MF using the peak hold mark 217B2 will be described.

First, a user who will perform MF operation operates to rotate the focus ring 106. When the position of the focus lens of the photographing optical system 102 is moved from the lens position L1 for example, at first it is unclear in which direction the focus ring 106 should be rotated and operated so that the focus lens is close to the focusing state.

In response, the user temporarily operates to rotate the focus ring 106 in any one of the rotation directions. Thereby, the focus lens is moved to any one of the rotation directions. In some cases, the focus lens position is moved whereby focusing is more deviated than the case in which the focus lens is located at the lens position L1 shown in FIG. 15, so that a blur of the subject is degraded. In this case, the focus ring 106 has been rotated in a direction in which the focus evaluation value MF v is lowered. In such a case, the user rotates the focus ring 106 in the backward direction opposite to the prior rotation direction in which the focus evaluation value MF v is lowered.

When the user rotates the focus ring 106 in the above-mentioned backward direction, the focus lens position is moved from the lens position L1 to the lens position L4 through the lens position L3. For example, when the focus lens is located at the lens position L4, the focus evaluation value MF v is the peak value (i.e., focusing is most accurately performed). Namely, when the focus lens is located at the lens position L4, the focus evaluation value MF v is the peak value (MF peak).

Even when the focus lens position reaches the lens position L4 and the focus evaluation value MF v reaches the peak value, it is unclear for the user whether the focus evaluation value is the peak value at that time. Therefore, also after the focus lens is located at the lens position L4, it is considered that the user continues the rotation operation of the focus ring 106 in the same direction. For example, when the focus lens reaches the lens position L5, a degree of blur of the display image is somewhat larger than that at the lens position L4, and, at the same time, the length of the display bar 217B1 in the focus meter 217B is shorter. Incidentally, the movement of the focus lens from the lens position L1 to the lens position L5 is represented as the first lens movement R1.

When the fully MF is applied, the user recognizes that the focus position has been passed, after which the user performs the operation for rotating the focus ring 106 in the backward direction to return the focus lens to the lens position L4. The movement of the focus lens from the lens position L5 to the lens position L1 is represented as the second lens movement R2.

When the focus lens is moved from the lens position L1 to the lens position L4 as shown in FIG. 16, each of the present focus evaluation value MF v in the lens positions L1 to L4 during the operation is always the peak value. Thereby, the focus evaluation values MF start, MF1, MF2, and MF peak in the lens positions L1 to L4 are respectively displayed by the peak hold marks 217B2.

When the focus lens has passed the lens position L4, the focus evaluation value MFv in the lens position L4 as the peak value MF peak is kept displayed by the peak hold mark 217B2.

Thus, the user can always recognize the peak value of the focus evaluation value MF v by seeing the peak hold mark 217B2. The user continues the focusing operation by rotating the focus ring 106 such that the display bar 217B1 reaches the peak hold mark 217B2.

FIG. 17 shows the change of the focus meter 217B in the second lens movement R2 of the focus lens. In the fully MF, the user rotates the focus ring 106 to temporarily move the focus lens to the lens position L5 in accordance with the second lens movement R2. Thereafter, the user recognizes that the focus evaluation value MF v has already passed the peak value by seeing the display bar 217B1 and the peak hold mark 217B2, and thus rotates the focus ring 106 in the backward direction. The user then moves the focus lens to the lens position L4 or a further lens position. FIG. 17 shows a display example of the display bar 217B1 when the focus lens is moved in the process of the second lens movement R2.

In the process of the second lens movement R2 of the focus lens, the user rotates the focus ring 106 to adjust the position of the photographing optical system 102. In this case, the user rotates the focus ring 106 to conform the upper end of the display bar 217B1 to the height of the peak hold mark 217B2. The conformation of the lens position of the focus lens to the lens position L4 (corresponding to the focus evaluation value MF peak) is clearly presented to the user. Therefore, the display format of the display bar 217B1 is changed at the time when the focus evaluation value MF v has conformed to the focus evaluation value MF peak representing the peak hold mark 217B2. Namely, in the process of the second lens movement R2 of the focus lens, the display format of the display bar 217B1 is changed at the time when the focus lens has reached the lens position L4.

As a result, the easiness of the focusing operation of the fully MF in the process of the second lens movement R2 of the focus lens is considerably improved.

In the example shown in FIG. 17, the display format of the display bar 217B1 is changed by changing the display color of the display bar 217B1. For example, the display color of the display bar 217B1 is usually white. In this case, as shown in FIG. 17 for example, the display color of the display bar 217B1 is changed from white to black at the time when the focus evaluation value MF v has conformed to the MF peak.

The change of the display format of the display bar 217B1 is not limited to changing the display color thereof from white to black. The display format of the display bar 217B1 may be changed by changing the display color to other color, changing the shape from a bar-like shape to an arrow shape for example, or sounding an alarm by a sound source built in the digital camera 300. As a method for changing the display format of the display bar 217B1, the user can select and set the display format of the display bar 217B1 as one of the menu items to be displayed by operating the menu button 222I, for example.

After the display format of the display bar 217B1 has been changed, the user further operates to rotate the focus ring 106, whereby the focus lens position is moved toward the lens position L1. Thereby, the focus evaluation value MF v reaches the MF peak, and then is lowered. When the focus evaluation value MF v is lowered below the first predetermined value K1, the peak hold mark 217B2 shows the focus evaluation value MF peak in the lens position L4, as shown in FIG. 16. At the same time, the display format of the display bar 217B1 is returned to the normal display format, that is, the display format shown in FIG. 16.

The display format of the display bar 217B1 is returned to the normal display format in order to clarify to the user that the focus lens position is not located at the focus position. In FIG. 17, the color of the display bar 217B1 is returned from black to white.

FIG. 18 shows a display example when the focus evaluation value MF v, which is higher than the peak focus evaluation value MF peak, is obtained in the vicinity of the lens position L4 as the focus position in the process of the second lens movement R2 of the focus lens.

The focus evaluation value MF v in the vicinity of the lens position L4 as the focus position, which is higher than the peak focus evaluation value MF peak, may be easily obtained by a variation of the repeatedly calculated focus evaluation values, a slight movement of a subject, or a camera shake. As shown in FIG. 18, when the focus evaluation value MF v, which is higher by a predetermined value than the peak focus evaluation value MF peak, is obtained, the peak value of the newly obtained focus evaluation value MF v is treated as the new peak focus evaluation value MF peak.

Namely, for example, the focus position is notified to a user by changing the display format of the display bar 217B1, such as changing the display color of the display bar 217B1. In some cases, the new peak focus evaluation value MF peak is obtained immediately before the focus position is notified to the user. In such a case, the position designated by the peak hold mark 217B2 is updated at the time when the new peak focus evaluation value MF peak has been obtained.

Thereby, even if the user does not recognize the change of the peak value of the focus evaluation value MF v, the user again operates to rotate the focus ring 106 in the backward direction by seeing the display bar 217B1. The display bar 217B1 conforms to the new peak focus evaluation value MF peak by the above rotation operation of the focus ring 106, whereby the focusing state can be provided. As a result, the completion of focusing can be notified to the user.

The focus position is notified to the user by changing the display format of the display bar 217B1, such as changing the display color of the display bar 217B1. In some cases, the new peak focus evaluation value MF peak is obtained immediately after the notification of the focus position to the user. In this case, the display format of the display bar 217B1 is returned to the normal display format. The display position of the peak hold mark 217B2 is updated so as to correspond to the new peak focus evaluation value MF peak. Thereby, the user can recognize that the peak value MF peak of the focus evaluation value MF v has been updated. The user further can easily adjust focusing.

FIG. 25 shows an outline of a process in which the focus lens is moved to the focus position by imager AF subsequent to MF. It is determined that the focus evaluation value MF v has changed beyond the peak value by MF in step S26. Thereafter, when the partial MF is selected as the MF mode, if it is determined that the focus evaluation value MF v has temporarily changed beyond the peak value whereby "1" is set to the value of the flag: "flag_peak", the transition to imager AF is performed (step S34).

The drive control of the focus lens by imager AF will be described with reference to FIG. 23. The focus evaluation value MF v changed beyond the peak focus evaluation value MF peak in the lens position L4 by the first lens movement R1 by MF. When the focus evaluation value MF v is changed to the focus evaluation value MF4 in the lens position L6, it is determined that the focus evaluation value MF v has changed beyond the peak value.

The focus evaluation value MF4 is also the focus evaluation value AF start at the starting of imager AF. The focus lens is then driven by imager AF. Thereby, the focus evaluation value MF v again changed beyond the peak value to be lowered to the focus evaluation value AF1. Thereafter, the focus lens is returned to the focus target position to achieve the focusing state.

FIG. 21 schematically shows only the focusing operation by imager AF. The imager AF control section 3B moves the focus lens from the lens position L6 toward the lens position L1 through the lens microcomputer 101 when imager AF is performed. When the focus lens starts moving, the focus evaluation value MF v is increased. The focus evaluation value MF v then changed beyond the peak value and thereafter decreases. The focus lens is moved until the focus evaluation value MF v changed beyond the peak value and thereafter starts to decrease.

Thereby, the information of the focus lens position is obtained. In addition to this information, groups of a series of the focus lens positions and the focus evaluation value MF v in each focus lens position (black circles in FIG. 21) as shown in FIG. 21 are obtained on the basis of the focus evaluation value MF v output from the focus evaluation value calculation section 2A.

When the focus evaluation value MF v becomes lower by a predetermined value than the peak value, the imager AF control section 3B determines that the focus evaluation value MF v has changed beyond the peak value. Thereby, the focus lens temporarily stops at the lens position L8, for example. The focus evaluation value MF v is calculated by the interpolation calculation or the like with the use of the lens position having the maximum focus evaluation value MF v, the focus evaluation value AF2 in the lens position L7, the focus evaluation values MF v in the lens position and in a plurality of lens positions before and after the lens position. As the target position, the focus lens is moved to a position where the focus evaluation value MF v is really the peak value.

According to the above embodiment, when the live view mode is selected in the photographing mode, in order to simplify MF operation by the user, it is possible to enlarge and display a specified partial region in the through image displayed on the liquid crystal monitor 217. For instance, after the starting of the MF mode, the user selects the menu item displayed by operating the menu button 222I, whereby it is possible to transfer to the input screen for selecting a partial region used for focus determination. When the menu item is not selected, the user performs the focusing operation without enlarging the through image being displayed on the liquid crystal monitor 217.

In addition, this embodiment can provide the following effect.

At first, a photographer closes the focus lens to the focusing state by MF to detect the change in the focus evaluation value. Thereby, when it is detected that the focus lens is close to the focusing state, the subsequent focusing operation can be performed by AF. Thus, the final focusing is performed by AF. Thereby, the focusing accuracy is improved, and, at the same time, the time required for focusing operation is reduced. Especially, even when the interchangeable lens of the digital camera is a lens for TTL phase difference AF, the focusing operation can be performed in a short time.

When the focus evaluation value has changed beyond the peak value, it is determined that the focus lens is close to the focusing state. Thereby, it is possible to reliably detect that the focus lens of the digital camera is close to the focusing state. In addition, the final focusing is performed by AF whereby the focusing accuracy is improved, and besides, the time required for the focusing operation is reduced. Especially, even when the interchangeable lens of the digital camera is the lens for TTL phase difference AF, the focusing operation can be performed in a short time.

When a photographer wants to perform the final focusing operation by himself, or when the photographer wants to realize a special photographing effect by intentionally photographing in a non-focusing state, the photographing optical system of the digital camera is moved in accordance with the setting by the photographer with complete fully MF, which is the same as the prior method, whereby photographing in a focusing state intended by the photographer can be performed.

The focus evaluation value is displayed with a preview image of the subject, whereby the photographer can know an objective focusing state. When the focusing operation is performed by MF, the focus meter can be used as an aid for grasping the focusing state. The focus meter 217B is displayed graphically such as the display bar 217B1. Thereby, the user can intuitively grasp the focusing state in comparison with the case in which the focus evaluation value is displayed as a numeric value. There is no problem in that the focusing operation is performed by MF while seeing the focus meter 217B in addition to seeing the image of the finder.

The maximum focus evaluation value to date is visually displayed as the peak hold mark 217B2. The photographer performing the focusing operation by MF glances at the focus meter 217B whereby he can easily grasp a target focusing state, and can easily perform operation for coming closer to the focusing state.

When the photographer performs the focusing operation by MF, the photographer confirms that the focus evaluation value is lower than the value of the peak hold mark 217B2 to move the focus lens backward. Thereby, when the focus evaluation value is increased again, the focus meter 217B having the changed display format is displayed, whereby it becomes extremely easy to determine whether the upper end of the peak hold mark 217B2 and that of the focus meter 217B are conformed to each other (whether the focusing state is obtained). Thus, the operability in the focusing operation by MF is improved.

When a lens of a camera is the interchangeable lens for the phase difference AF, this lens is optimized by the focusing operation by the phase difference AF, whereby a photographer can perform the optimum focusing operation for the characteristics of the interchangeable lens by the focusing operation by the phase difference AF.

Although the invention has been described based on the above embodiment, it is not limited to the above embodiment but various modifications and variations are possible within the spirit and scope of the invention.

Especially, a program realizing the function of the above embodiment is provided in a computer having a photographing function, and the computer executes this program, whereby the function of the above embodiment can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital camera comprising:
   a taking lens which forms a subject image of a subject;
   a lens drive section which moves the taking lens along an optical axis;
   an imaging section which repeatedly takes the subject image formed by the taking lens at a predetermined time interval to output a sequence of image signals;
   a focus evaluation value calculation section which repeatedly calculates a focus evaluation value representing a degree of a focusing state of the taking lens with respect to the subject image, on the basis of the image signals output from the imaging section;
   a manual focus controller which controls the lens drive section to move the taking lens in response to a manual operation;
   a focus evaluation value change detection section which detects a change in the focus evaluation value generated by the movement of the taking lens;
   an auto focus controller which controls the lens drive section in accordance with the change in the focus evaluation value detected by the focus evaluation value change detection section to moves the taking lens so as to be focused on the imaging section; and
   a switching section which automatically switches the control of the lens drive section from the manual focus controller to the auto focus controller when the focus evaluation value change detection section detects that the focus evaluation value has changed by decreasing beyond a peak value at the time when the taking lens is moved by the manual focus controller.

2. The digital camera according to claim 1, further comprising:
   a setting section which sets a focusing operation for moving the taking lens,
   wherein while the taking lens is moved under the control of the manual focus controller, even in the case where the focus evaluation value, detected by the focus evaluation value change detection section, has changed by decreasing beyond the peak value, the setting section realizes a setting in which the control to the lens drive section is not switched to the auto focus controller.

3. The digital camera according to claim 1, further comprising:
   a display section which displays a live image on the basis of the sequence of image signals output from the imaging section;
   an indicator production section which produces an indicator for displaying graphically the focus evaluation value; and
   an image addition section which adds the indicator, produced by the indicator production section, to the live image,
   wherein at least when the lens drive section is controlled by the manual focus controller, the display section displays the live image to which the indicator is added.

4. The digital camera according to claim 3, further comprising:
a display format controller which controls a display format of the indicator,
wherein at least when the taking lens is moved by the manual focus controller and the focus evaluation value change detection section detects that the focus evaluation value has changed by decreasing beyond the peak value, the display format controller changes the display format of the indicator when the focus evaluation value once again conforms to the peak of the focus evaluation value.

5. The digital camera according to claim 4, wherein the indicator production section has a focus meter as the indicator, which display a bar with a length that corresponds to the focus evaluation value,
the display format controller changes a color of the display bar as a change of the display format of the indicator.

6. The digital camera according to claim 3, wherein the indicator production section has a focus meter as the indicator, which displays a bar with a length that corresponds to the focus evaluation value.

7. The digital camera according to claim 6,
wherein the display format controller displays a peak hold mark which represents a peak position of the focus evaluation value, on the focus meter, and holds the peak hold mark at the peak position of the focus evaluation value even when the focus evaluation value has decreased after the peak value is reached.

8. The digital camera according to claim 1,
wherein the auto focus controller controls the lens drive section to move the taking lens in a direction opposite of the moving direction of the taking lens controlled by the manual focus controller when the switching section switches from the manual focus controller to the auto focus controller.

9. A digital camera comprising: a taking lens which forms a subject image of a subject;
a lens drive section which moves the taking lens along an optical axis; an imaging section which repeatedly takes the subject image formed by the taking lens at a predetermined time interval to output continuous image signals;
a focus evaluation value calculation section which repeatedly calculates a focus evaluation value representing a degree of a focusing state of the taking lens with respect to the subject image, on the basis of the image signal output from the imaging section;
a manual focus controller which controls the lens drive section to move the taking lens in response to a manual operation;
a splitting optical system which splits a light path, having entered through the taking lens, into a plurality of light paths to form an image;
a phase difference detection section which detects an amount of deviation between a plurality of optical images formed by the splitting optical system;
a first auto focus controller which controls the lens drive section on the basis of the amount of deviation between said each optical image, detected by the phase difference detection section, to move the taking lens such that the subject image is focused on the imaging section;
a focus evaluation value change detection section which detects a change in the focus evaluation value generated by the movement of the taking lens;

a second auto focus controller which controls the lens drive section in accordance with the change in the focus evaluation value detected by the focus evaluation value change detection section to move the taking lens so as to be focused on the imaging section; and
a focus mode selection section which selects at least one of an auto focus mode, a manual focus mode and a semi auto focus mode, the auto focus mode driving the lens drive section under the control of the first auto focus controller to move the taking lens to the focusing position, the manual focus mode driving the lens drive section under the control of the manual focus controller to move the taking lens by a manual operation, the semi auto focus mode automatically switching the manual focus controller to the second auto focus controller when a change of decreasing beyond a peak in the focus evaluation value is detected by the focus evaluation value change detection section to move the taking lens to the focusing position.

10. The digital camera according to claim 9,
wherein the auto focus controller controls the lens drive section to move the taking lens in a direction opposite of the moving direction of the taking lens controlled by the manual focus controller when the switching section switches from the manual focus controller to the auto focus controller.

11. A focus control method for a digital camera comprising: repeatedly taking a subject in a continuous manner at predetermined time interval by an imaging section and outputting a sequence of image signals;
displaying a live image on the basis of the sequence of image signals taken by the imaging section to a monitor of the digital camera repeatedly calculating a focus evaluation value, representing a degree of a focusing state of a taking lens, on the basis of an image signal output from the imaging section;
performing manual focusing for moving the taking lens in response to a manual;
detecting a change in the focus evaluation value generated in accordance with the movement of the taking lens; and
when a change decreasing beyond a peak in the focus evaluation value is detected during manual focusing, performing one of a first focusing mode for continuing manual focusing and a second focusing mode for making transition to auto focusing in which the taking lens is automatically moved such that the focus evaluation value becomes a peak value in accordance with a predetermined selection by an user.

12. The focus control method according to claim 11, further comprising:
producing an indicator which displays graphically the focus evaluation value; adding the indicator to the live image to produce synthesized image data; and
displaying the synthesized image data in the display the digital camera.

13. The focus control method according to claim 12, wherein while manual focusing is performed, the synthesized image is displayed in the monitor of the digital camera.

14. The focus controlling method according to claim 11,
wherein the moving direction of the taking lens is of an opposite direction from the moving direction during manual focusing when the second mode is selected and transitions from manual focusing to auto focusing occurs.

* * * * *